US012810300B2

(12) United States Patent
Albu et al.

(10) Patent No.: US 12,810,300 B2
(45) Date of Patent: Nov. 24, 2026

(54) METHODS AND SYSTEMS FOR ALERT CONFIGURATION

(71) Applicant: NASDAQ TECHNOLOGY AB, Stockholm (SE)

(72) Inventors: Sanda-Maria Albu, London (GB); Marie Romani, Stockholm (SE); Oleksandr Brudnovskyi, Cracow (PL)

(73) Assignee: Nasdaq, Inc., New York, NY (US)

( * ) Notice: Subject to any disclaimer, the term of this patent is extended or adjusted under 35 U.S.C. 154(b) by 78 days.

(21) Appl. No.: 18/517,958

(22) Filed: Nov. 22, 2023

(65) Prior Publication Data

US 2025/0165981 A1 May 22, 2025

(51) Int. Cl.
*G06Q 20/40* (2012.01)
*G06Q 40/04* (2012.01)

(52) U.S. Cl.
CPC ......... *G06Q 20/4016* (2013.01); *G06Q 40/04* (2013.01)

(58) Field of Classification Search
CPC ...................................................... G06Q 40/04
USPC ........................................................... 705/38
See application file for complete search history.

(56) References Cited

U.S. PATENT DOCUMENTS

2004/0059666 A1* 3/2004 Waelbroeck ........... G06Q 40/04 705/37
2012/0150713 A1* 6/2012 Russel ................... G06Q 40/04 705/37
2020/0273104 A1* 8/2020 Ushman ............ G06Q 30/0206

FOREIGN PATENT DOCUMENTS

WO WO-2012100327 A1 * 8/2012 ............. G06Q 10/06

OTHER PUBLICATIONS

Authors: Punit Dewan et al; Title: Capital market surveillance using stream processing; Date Added to AEEE Xplore: Nov. 29, 2010. (Year: 2010).*
Authors: Shweta Tiwari et al; Title: Machine Learning in Financial Market Surveillance: A Survey; Publisher: IEEE; Date of Pub: Nov. 25, 2021. (Year: 2021).*

* cited by examiner

*Primary Examiner* — Olabode Akintola
(74) *Attorney, Agent, or Firm* — Nixon & Vanderhye P.C.

(57) ABSTRACT

This disclosure describes surveillance alert configuration and control systems and methods that efficiently represent the impact of pending configuration changes to sets of surveillance alerts across types of surveillance alerts, different activation levels, electronic trading systems, etc. of alert configurations in a manner that facilitates improved reliability and improved response times in reacting to abnormal user events or abnormal system events in computer processing systems, such as, for example, electronic trading systems, are provided.

19 Claims, 33 Drawing Sheets

600

```
602 ──↓ parameterEditor (pin)
          → markets (pin): { list: {_}, current: "market2"}
          → currency (pin): { market2 : "CAD" }
          → alertTypes (pin): { list: {_}, isSingle: true, selectedItems: [_] }
          → entities (pin): { list: [_], current: "HOUSE" }
 603 ──── → initial (pin): { market2: {_} }
   606 ──── ↓ market2 (pin)
     608 ──── ↓ Alert_1 (pin)
       610 ──── ↓ HOUSE (pin)
         612 ──── ↓ Param_1 (pin)
           614 ──── → f44af7dc-86ce-4331-a3e7-b53738df1c07 (pin): { uuid: "f44af7dc-8…" ,  market: "market2" , … }
                   ↓ Param_9 (pin)
                     → 27a60ee6-f8f8-4e35-93e2-540952ce2cf1 (pin): { uuid: "27a60ee6-f…" , market: "market2" , … }
   604 ──── changes (pin): { }
        → participantTypes (pin): { market2: {_} }
          → filterOptions (pin): { market2 : {_} }
            isLoadingTable (pin): false
          → specification (pin): { market2 : {_} }
            validation (pin): { }
            toBeLoaded (pin): { }
          → marketSegments (pin): { : [], market2 : [] }
            changesToCopy (pin): []
          → filterModal (pin): { type: "", isOpen: false, selectedValue: "" ,  _ }
          → setting (pin): {showAllColumns: true}
```

FIG. 6A

620

```
↓ parameterEditor (pin)
    → markets (pin): { list: {_}, current: "market2" }
    → currency (pin): { market2 : "CAD" }
    → alertTypes (pin): { list: {_}, isSingle: true, selectedItems: [_] }
    → entities (pin): { list: [_], current: "HOUSE" }
603 ↓ initial (pin): { market2 : {_} }
        ↓ market2 (pin)
            ↓ Alert_1 (pin)
                ↓ HOUSE (pin)
                    ↓ Param_1 (pin)
                        → f44af7dc-86ce-4331-a3e7-b53738df1c07 (pin): { uuid: "f44af7dc-8..." , market: "market2" , ... }
                    ↓ Param_9 (pin)
                        → 27a60ee6-f8f8-4e35-93e2-540952ce2cf1 (pin): { uuid: "27a60ee6-f..." , market: "market2" , ... }
604 ↓ changes (pin): { }
626     ↓ market2 (pin)
628         ↓ Alert_1 (pin)
630             ↓ HOUSE (pin)
632                 ↓ Param_1 (pin)
634                     → f44af7dc-86ce-4331-a3e7-b53738df1c07 (pin): { uuid: "f44af7dc-8..." , market: "market2" , ... }
636                     → 103a70fd-ea88-4ce9-9ba5-24256873f8cc (pin): { uuid: "f44af7dc-8..." , market: "market2" , ... }
    → participantTypes (pin): { market2 : {_} }
    → filterOptions (pin): { market2 : {_} }
      isLoadingTable (pin): false
    → specification (pin): { market2 : {_} }
      validation (pin): { }
      toBeLoaded (pin): { }
    → marketSegments (pin): { : [], market2 : [] }
      changesToCopy (pin): []
    → filterModal (pin): { type: "", isOpen: false, selectedValue: "" , _ }
    → setting (pin): {showAllColumns: true}
```

FIG. 6B

METHODS AND SYSTEMS FOR ALERT CONFIGURATION

CROSS REFERENCE(S) TO RELATED APPLICATION(S)

This application is related to the following applications, filed on even date herewith: U.S. design patent application Ser. No. 29/917,955; U.S. design patent application Ser. No. 29/917,952; U.S. design patent application Ser. No. 29/917,954; U.S. design patent application Ser. No. 29/917,957; U.S. design patent application Ser. No. 29/917,959; U.S. design patent application Ser. No. 29/917,961; U.S. design patent application Ser. No. 29/917,962, the contents of which are herein incorporated by reference.

TECHNICAL OVERVIEW

The technology described herein relates to managing computer system configuration parameters. More particularly, the technology described herein relates to alert configuration and management in computer systems.

INTRODUCTION

Many computer systems exist that analyze vast amounts of data and search for patterns within that data. One example of such a computer system is a trading surveillance system.

In some kinds of electronic trading, client computer systems transmit and receive messages to/from other computer systems on which a market (or markets) are operating. These messages may indicate, for example, orders to buy or sell assets, instructions to cancel pending orders, acknowledgements of orders, and so on. In some instances, these messages are transmitted rapidly and at tremendous volumes, and the electronic records related to these messages can be vast in size.

Trading surveillance systems (or more broadly "surveillance systems") may be used to look for patterns in these messages (and/or records thereof) and issue alerts if the messages indicate that interactions with a market may be legally noncompliant (e.g., if the messages indicate spoofing or some other kind of market manipulation was potentially taking place). While existing surveillance systems have proven to be very useful, more is always being demanded of them.

Accordingly, it will be appreciated that new and improved techniques, systems, and processes, related to trading surveillance systems and other kinds of computer systems, are continually sought after.

SUMMARY

According to some embodiments, surveillance alert configuration and control systems and methods that efficiently represent the impact of pending configuration changes of surveillance alerts across types of surveillance alerts, activation levels, electronic trading systems, etc. in a manner that facilitates improved reliability and improved response times in reacting to abnormal user events or abnormal system events in computer processing systems, such as, for example, electronic trading systems, are provided.

This Summary is provided to introduce a selection of concepts that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

These and other features and advantages will be better and more completely understood by referring to the following detailed description of example non-limiting illustrative embodiments in conjunction with the drawings of which:

FIGS. 6A and 6B show an example sequence of code for efficiently storing the parameter change information, according to come embodiments;

DETAILED DESCRIPTION

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Figure 5:
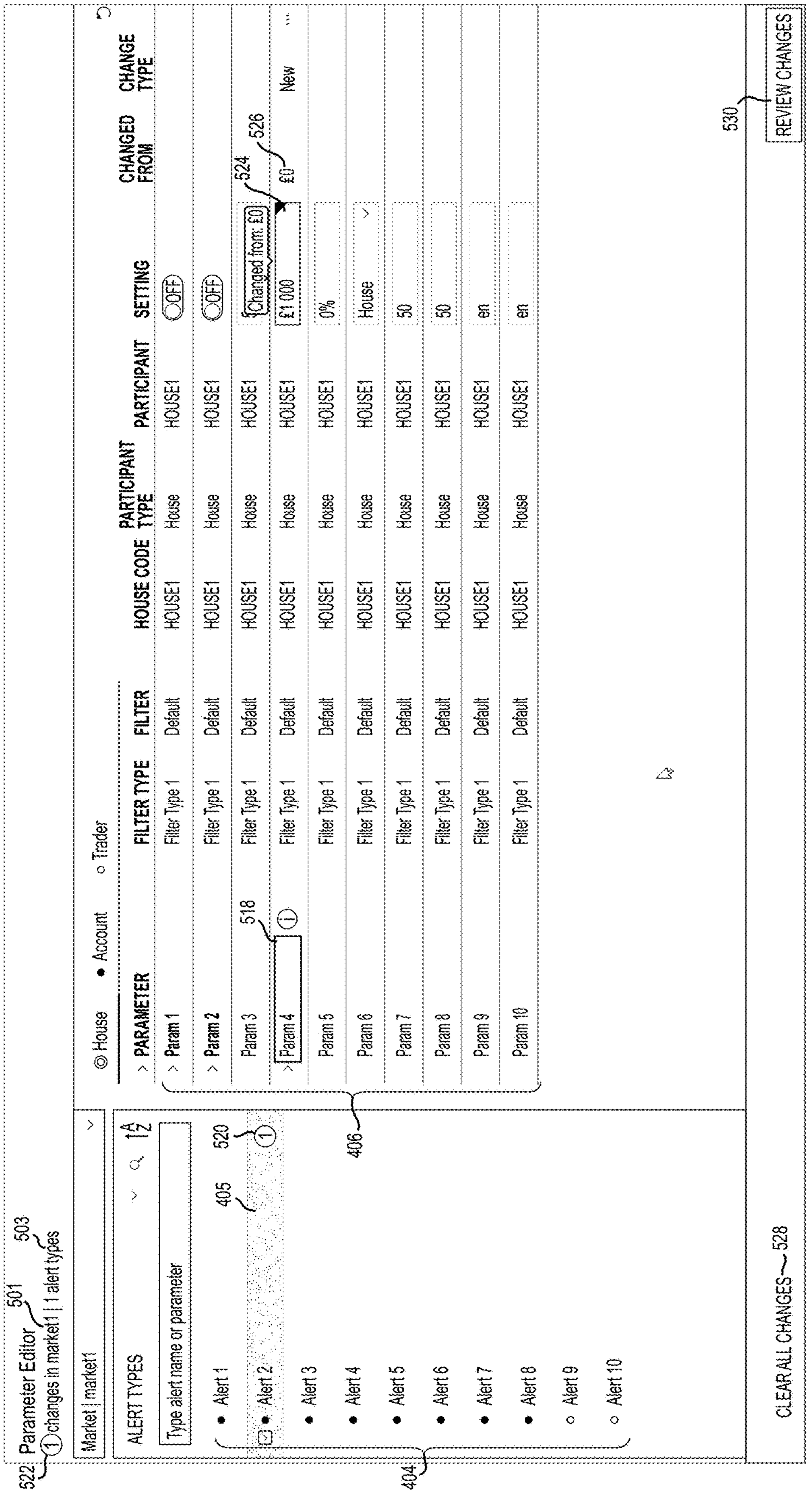
FIG. 5 shows an example of the alert parameter configuration interface of FIG. 4 when an alert parameter has been changed and pending change counters are shown, according to some embodiments.

Sections are used in this Detailed Description solely in order to orient the reader as to the general subject matter of each section; as will be seen below, the description of many features spans multiple sections, and headings should not be read as affecting the meaning of the description included in any section. Some reference numbers are reused across multiple Figures to refer to the same element; for example, as will be provided below, aspects of counter 522 first shown in FIG. 5 is also referenced and described in connection with several other figures.

Overview

This disclosure describes systems and techniques for configuring and/or managing alerts, such as, for example, surveillance alerts that are generated based on monitoring one or more participants' transactions associated with one or more high-volume high-speed electronic securities trading systems in a manner that enables improved response times by operators in detecting and responding to abnormal events in the system. Embodiments, however, are not limited to electronic securities trading systems, and may apply to many other types of computer processing systems for which alerts are used for monitoring aspects of transaction flows to/from the system, system performance or processing resources.

Figure 1:
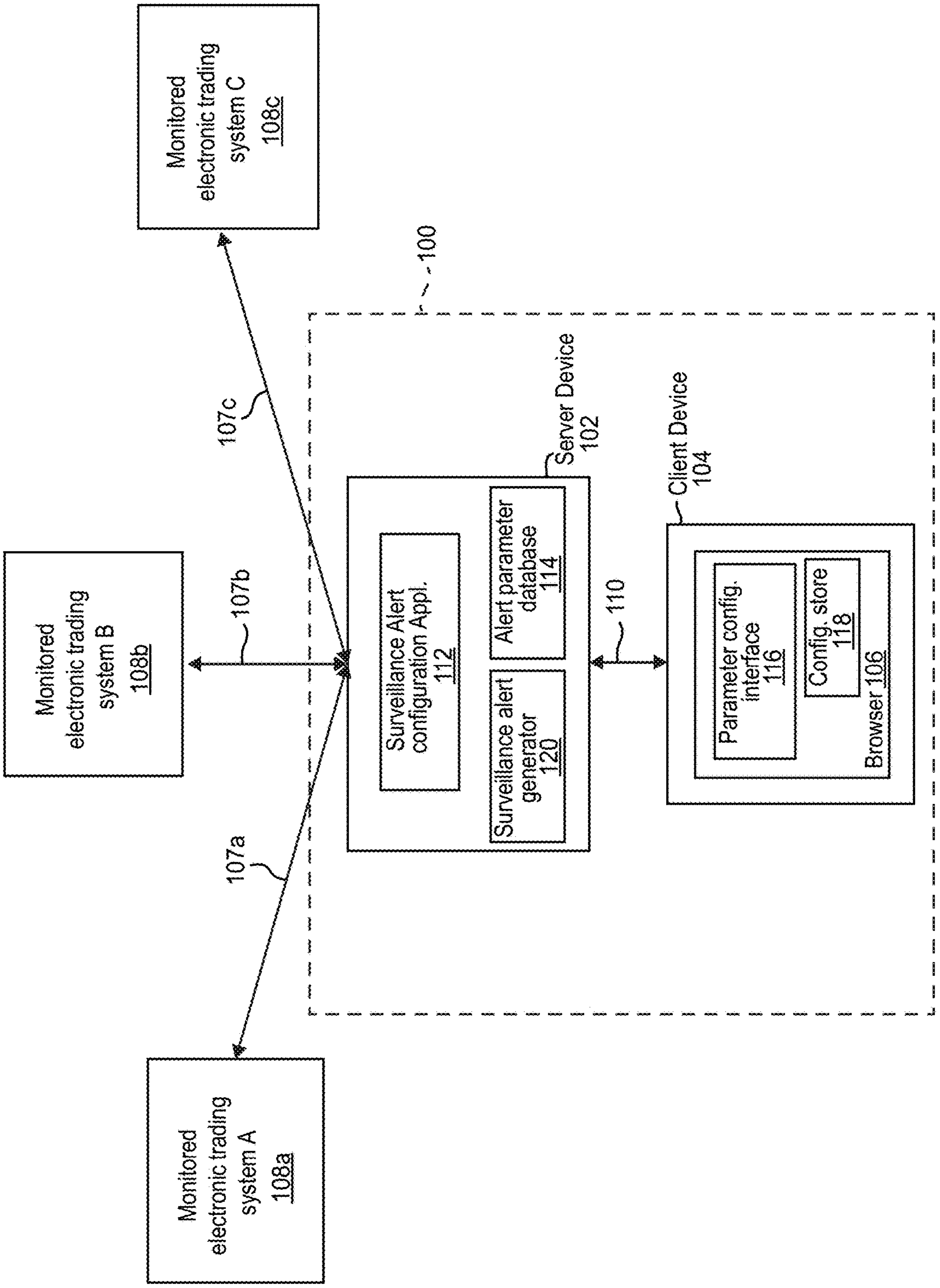
FIG. 1 shows an example surveillance alert configuration and management computer system that monitors one or more electronic securities trading systems, according to some embodiments.
Figure 2:
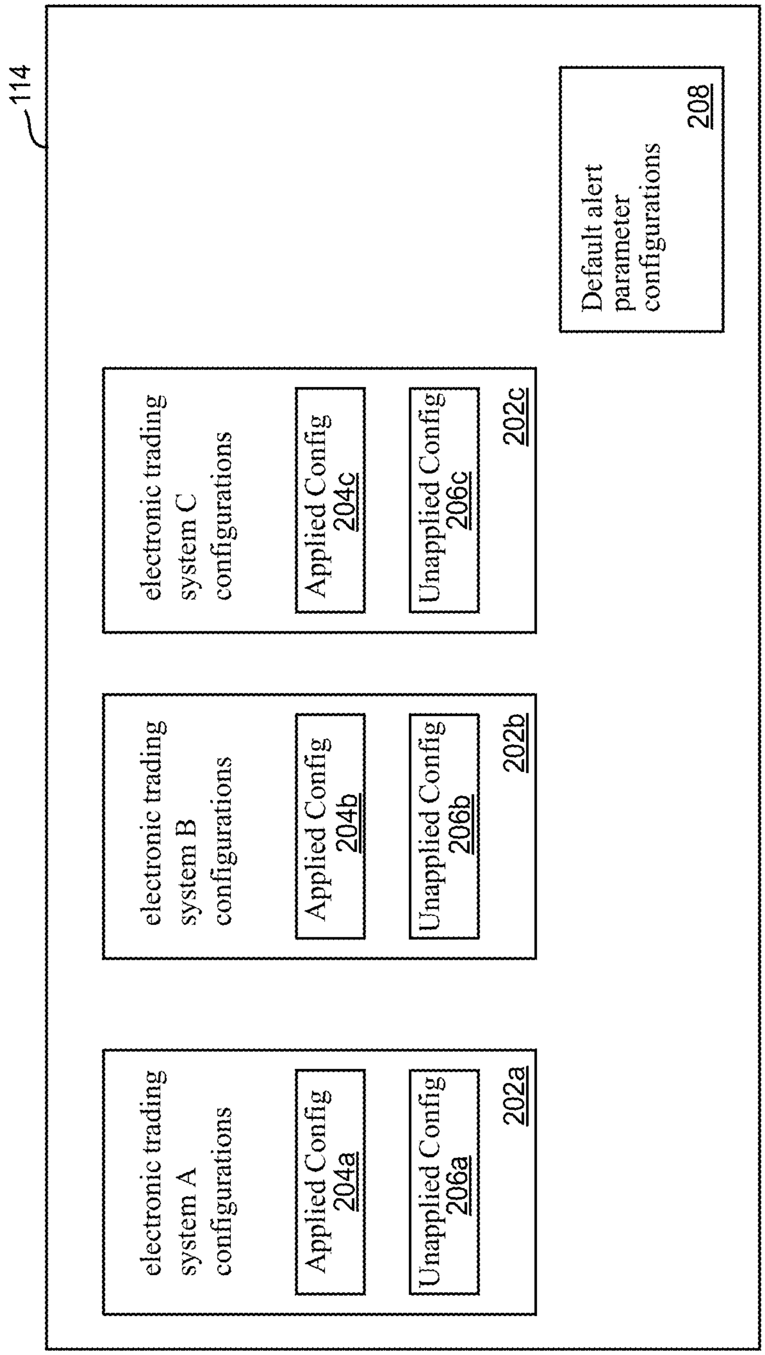
FIG. 2 shows an example surveillance alert parameter configuration database in a system such as the system of FIG. 1, according to some embodiments.
Figure 3:
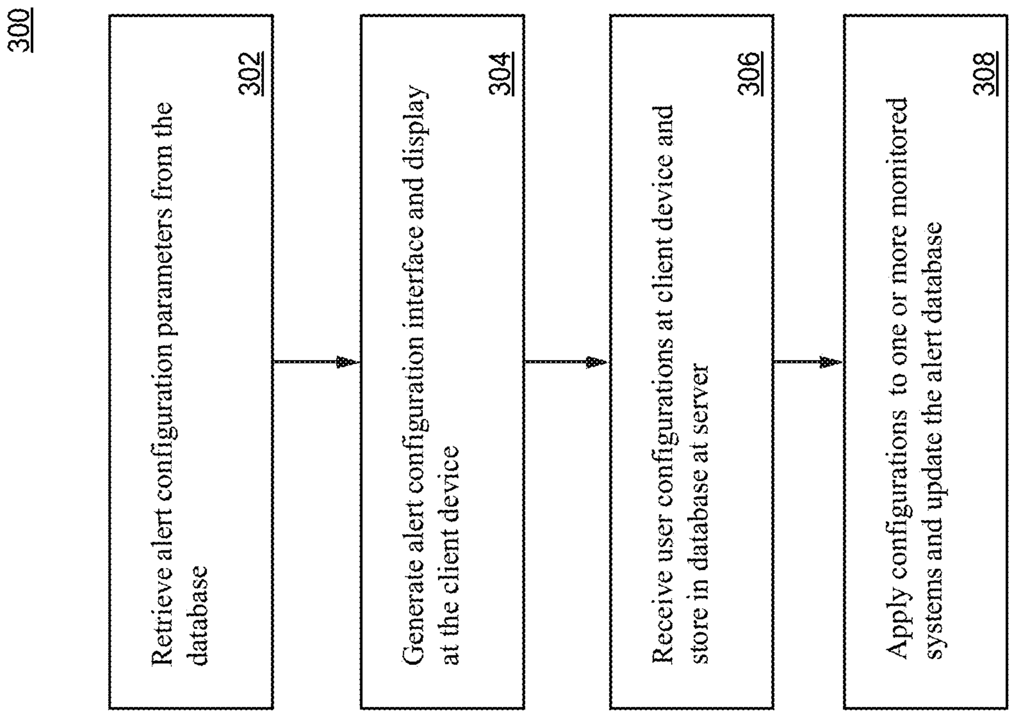
FIG. 3 shows a flowchart of a process for configuring/reconfiguring of surveillance alert parameters by an operator using a client browser in a system such as the computer system of FIG. 1, according to some embodiments.

FIG. 1 shows an example surveillance alert configuration and management system for managing and controlling alerts for one or more electronic securities trading systems, according to some embodiments of this disclosure. The system enables an operator to, in response to real-time events in the electronic securities trading systems, for example, as detected by monitoring the transaction (e.g., request/response) flow between one or more participants in the electronic trading system and the electronic trading system, or based on other factors, to efficiently configure and deploy surveillance alerts via an alert configuration user interface. The alert configuration user interface and associated processes enable the operator to efficiently view the effects of new configuration changes upon the alert configurations throughout the electronics securities trading systems. The capabilities provided by the alert configuration user interface to efficiently control alert configurations throughout the system can improve the system's responsiveness to detect and manage events that degrades the monitored computer systems or degrades the efficiency and reliability of the electronic securities trading systems. FIG. 2 shows an example alert configuration database that can be used in the system of FIG. 1. The database is configured to store alert configurations in a manner that facilitates fast retrieval of related configuration changes such that the system enables improved reliability and response times with respect to responding to abnormal events. FIG. 3 shows a flowchart of an example process by which surveillance alerts can be configured and deployed in the system of FIG. 1.

Figure 4:
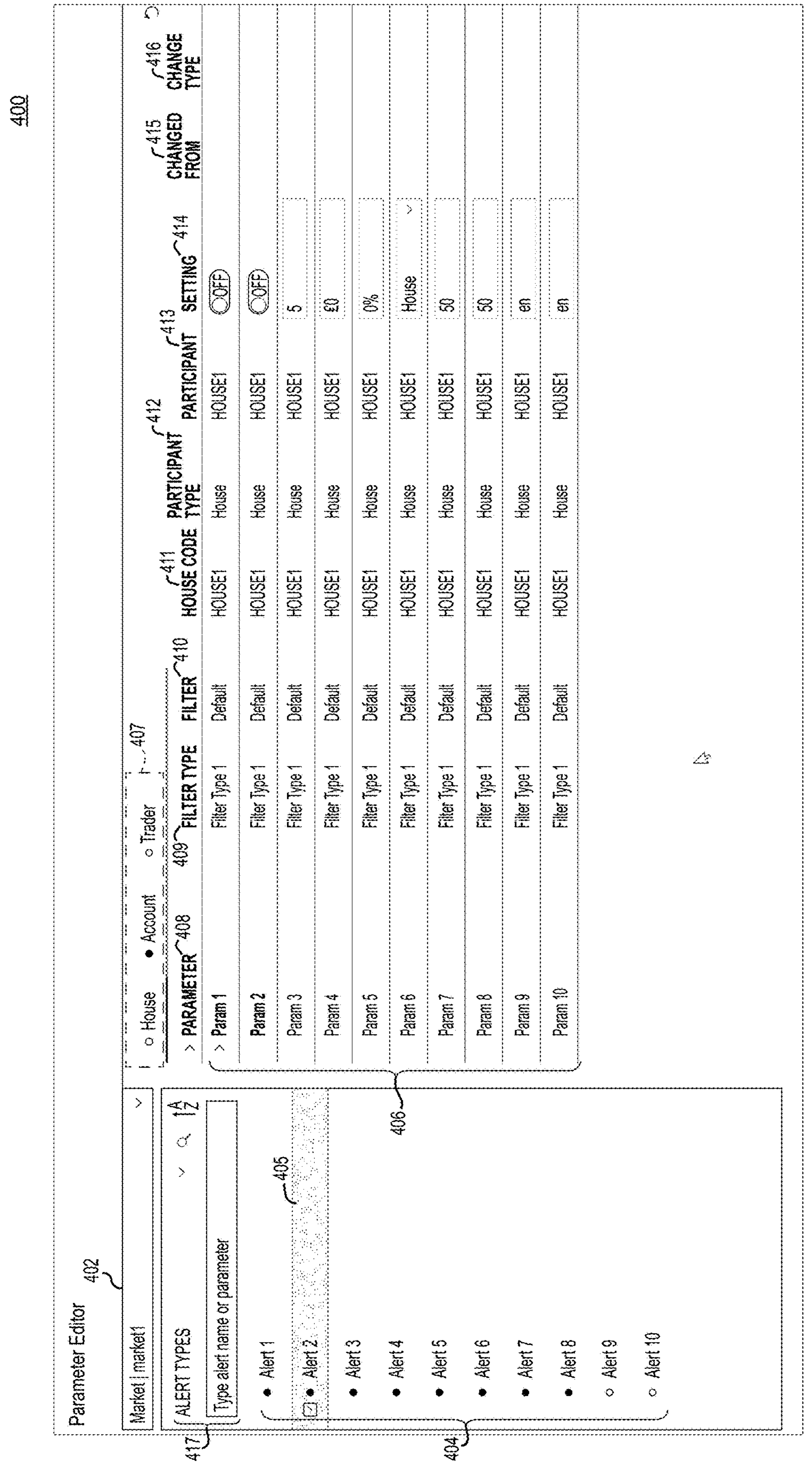
FIG. 4 shows examples of an alert parameter configuration interface that can be displayed on the client browser such as the client browser in FIG. 1, according to some embodiments.
Figure 7:
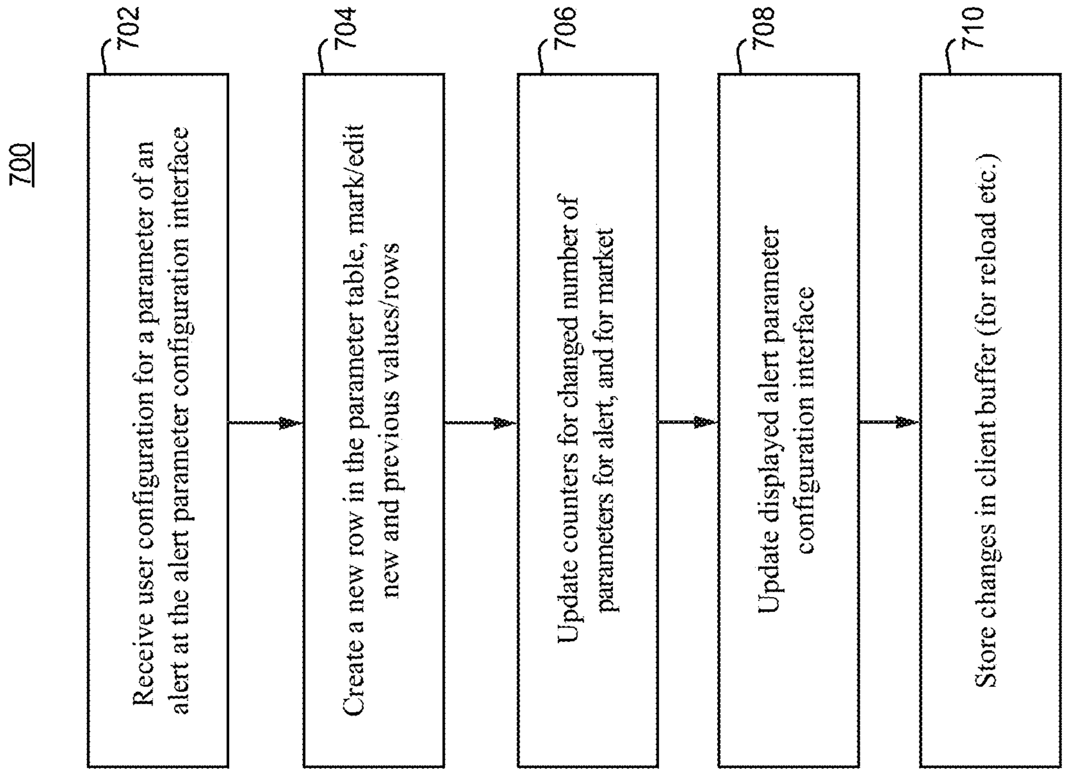
FIG. 7 shows an example flowchart of the operation of the alert parameter configuration interface in FIG. 4, for example, according to some embodiments.

FIG. 4 shows an example alert configuration interface screen used in the system of FIG. 1. The alert configuration user interface screen enables the operator to view the effects of alert parameter configuration on the entire system in a manner that provides for efficiently and reliably responding to dynamic events. FIG. 5 shows an example of how an alert configuration user interface screen displays the impact of a change to a selected alert parameter. FIGS. 6A and 6B show an example data structure that provides for efficiently displaying the alert configuration user interface screen during user configuration. The data structure may be used for storing alert information in the database shown in FIG. 2. FIG. 7 shows a flowchart of an example process that provides for alert configuration user interface screens to be displayed in a manner that minimizes delays in dynamically representing the impact of user configurations on the system in order to facilitate faster responses by the operator to system events.

Figure 8:
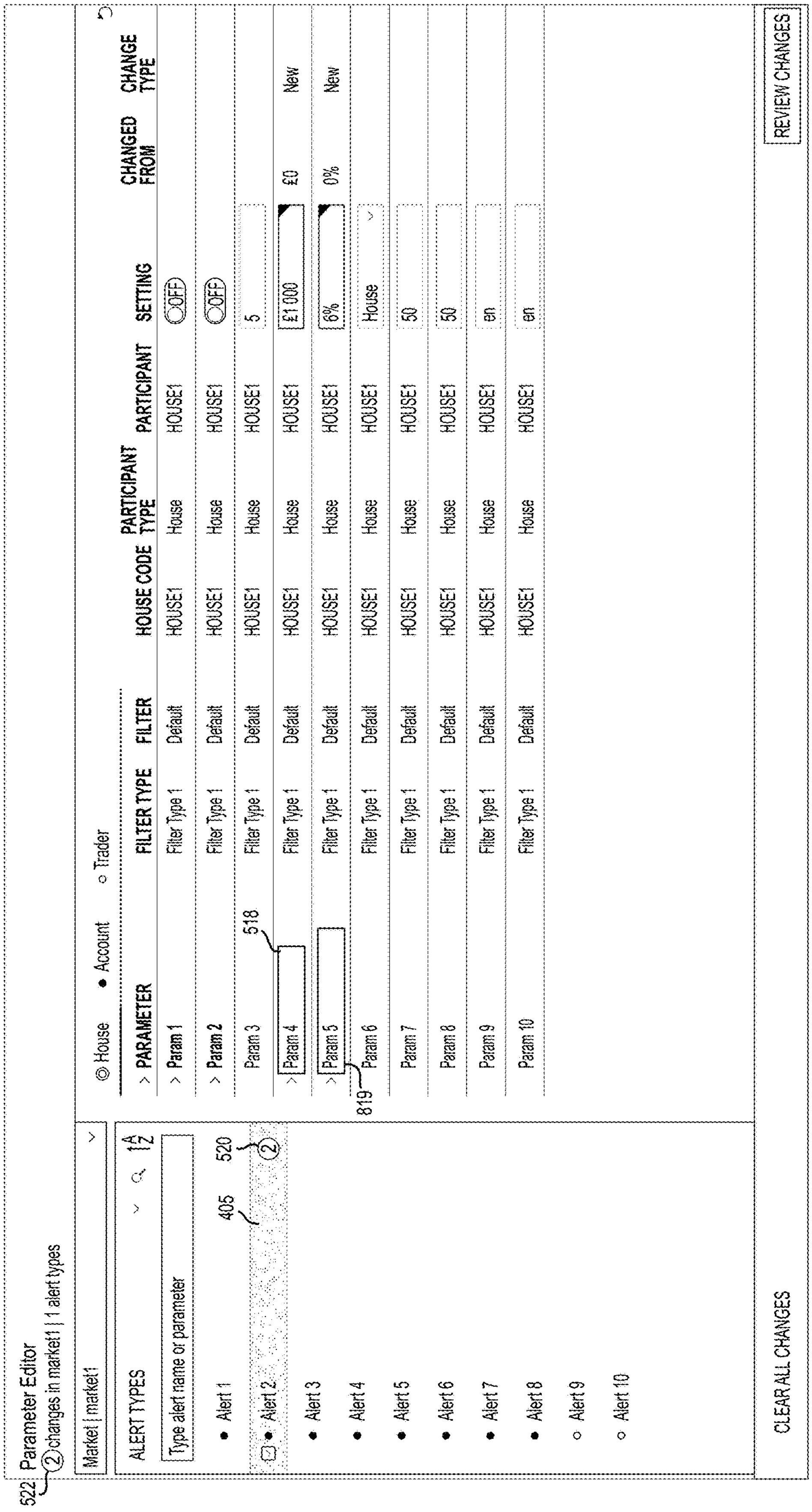
FIG. 8 shows an example of the alert configuration interface of FIG. 5 with a second parameter of the same alert being configured and the resulting changes to the counters being displayed, according to some embodiments.

In order to facilitate fast response times by the operator in reacting to system events, embodiments of the present disclosure provide user interface screens that enable the operator to visualize the impact of various types of alert configuration changes across markets and across different alert types in the system before such changes are deployed. FIG. 8 shows an example alert configuration interface screen when multiple parameters of the same alert are changed. FIGS. 9-11B illustrate the effect of changing a parameter setting of an alert in multiple markets, and reversing such changes, according to some embodiments. FIG. 12 illustrates an example of a multiselect capability that enables a fast configuration of an or condition in an input field, according to some embodiments. FIGS. 13-21 show examples of changing a default parameter setting, deleting or adding overrides, types of overrides, and the effect of changes to parameter settings at different levels of activation, according to some embodiments. FIG. 22 shows an example screen in which the same parameter is configured separately for two entities, at a particular activation level, in the same market, according to some embodiments.

Figure 23:
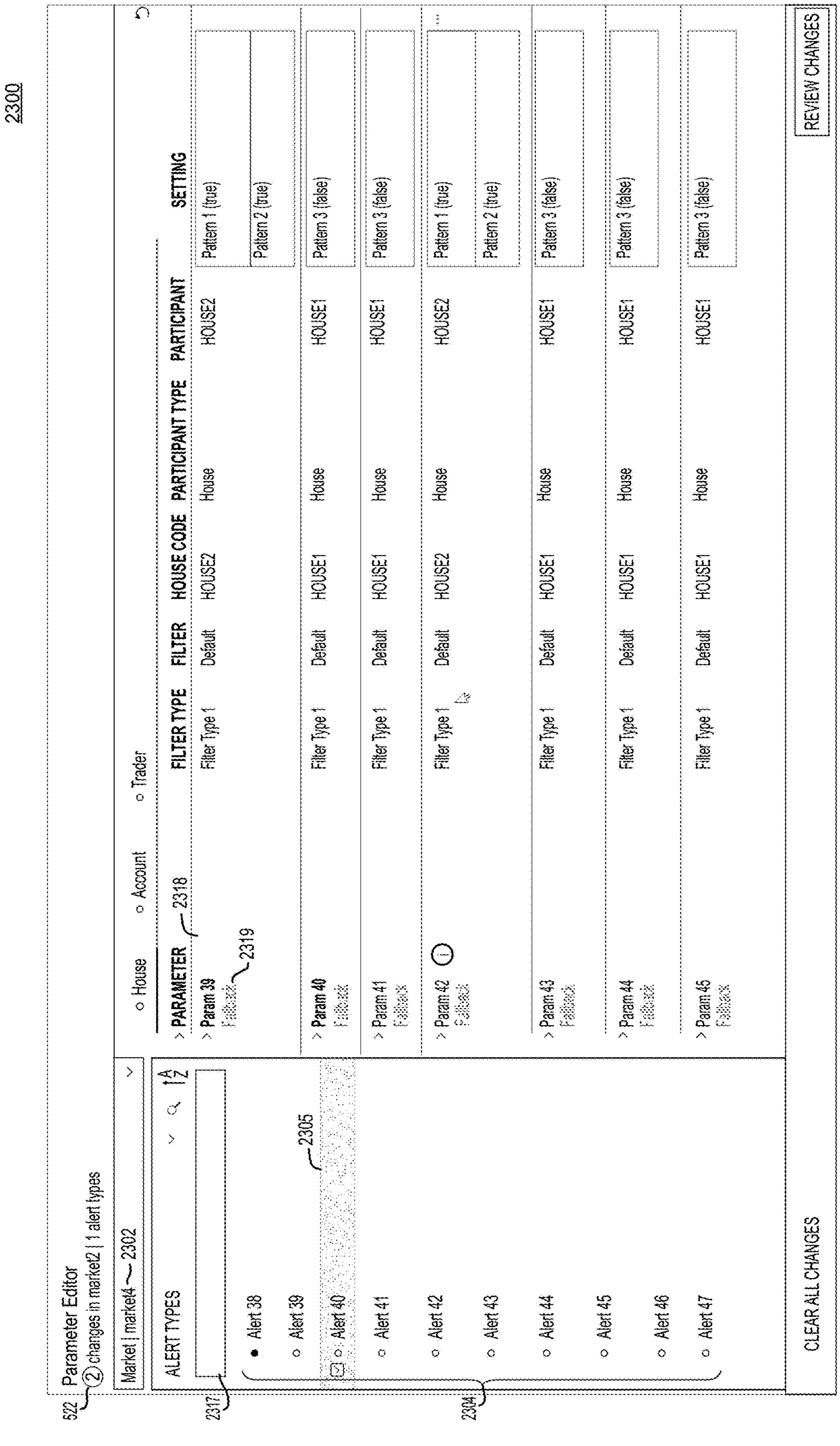
FIGS. 23-25 show examples of a "pattern alert" configuration functionality according to some embodiments.
Figure 24:
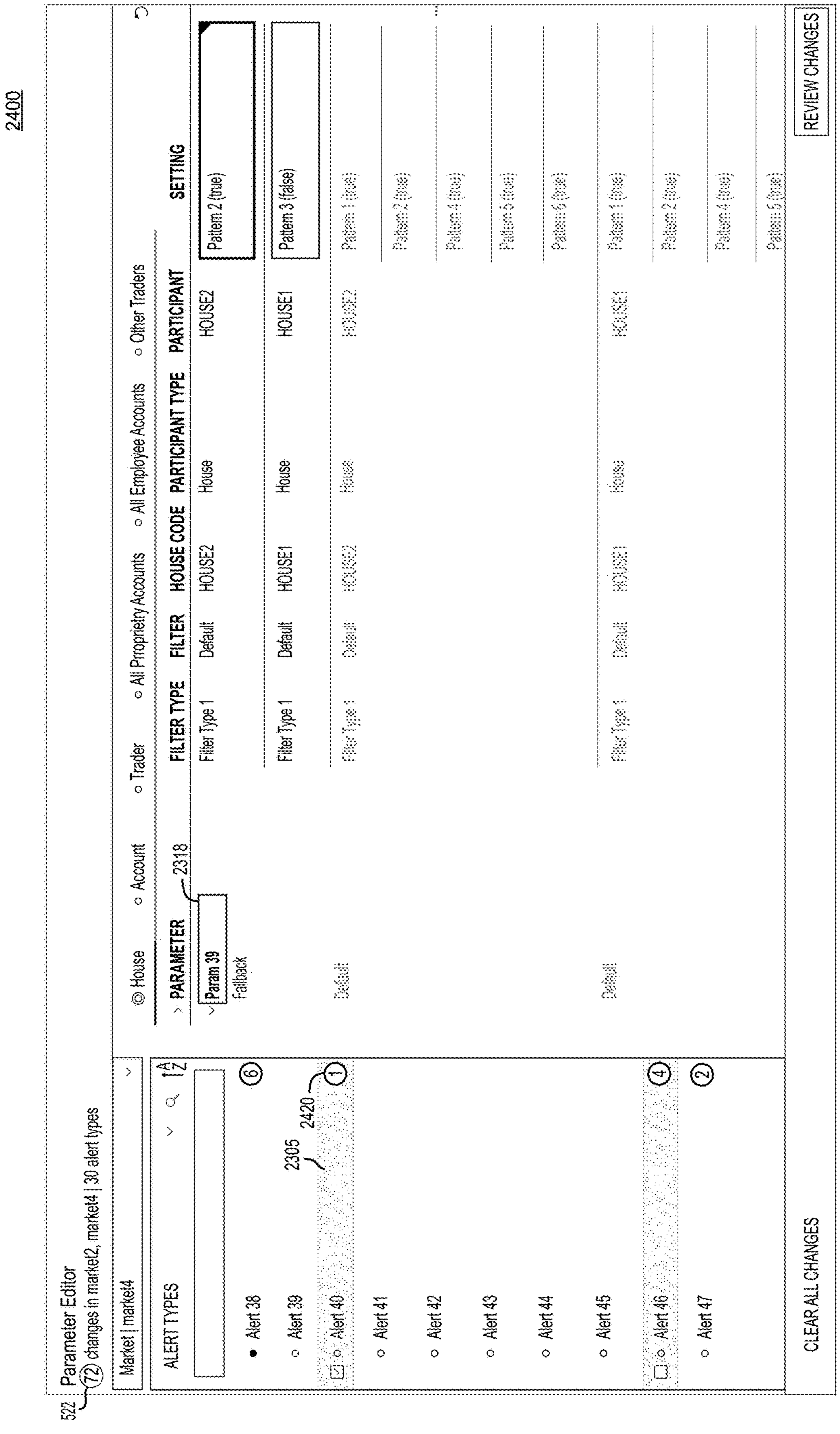
Figure 25:
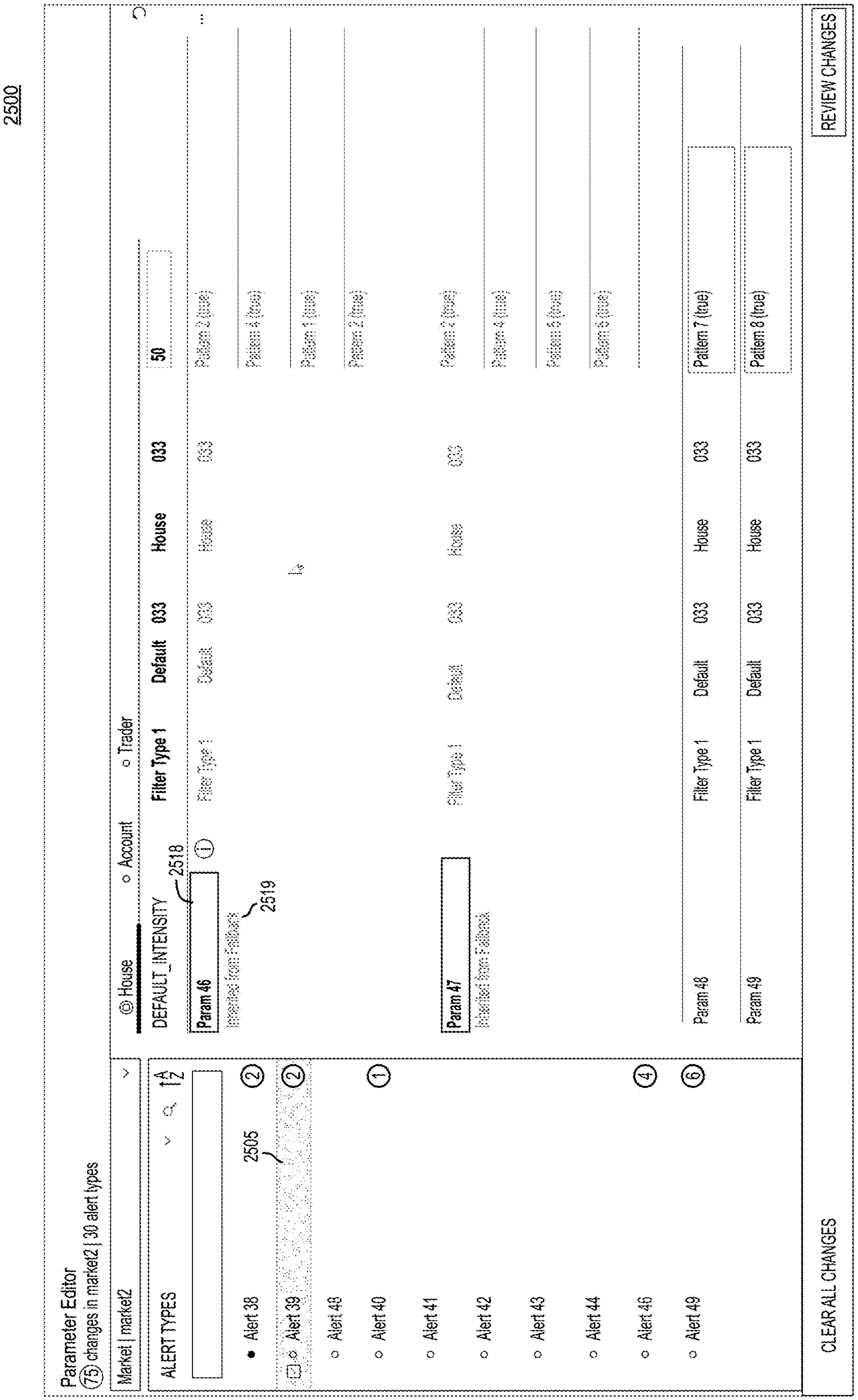

Some embodiments provide for the settings of certain parameters to be used in the configuration of other parameters in the same or different alerts, and in the same or different markets. The system provides for efficiently representing such configuration changes to the operator. FIGS. 23-25 show examples of a "pattern alert" configuration functionality where a configuration change in one parameter can affect the configurations of many other parameters and alerts, according to some embodiments.

Figure 26:
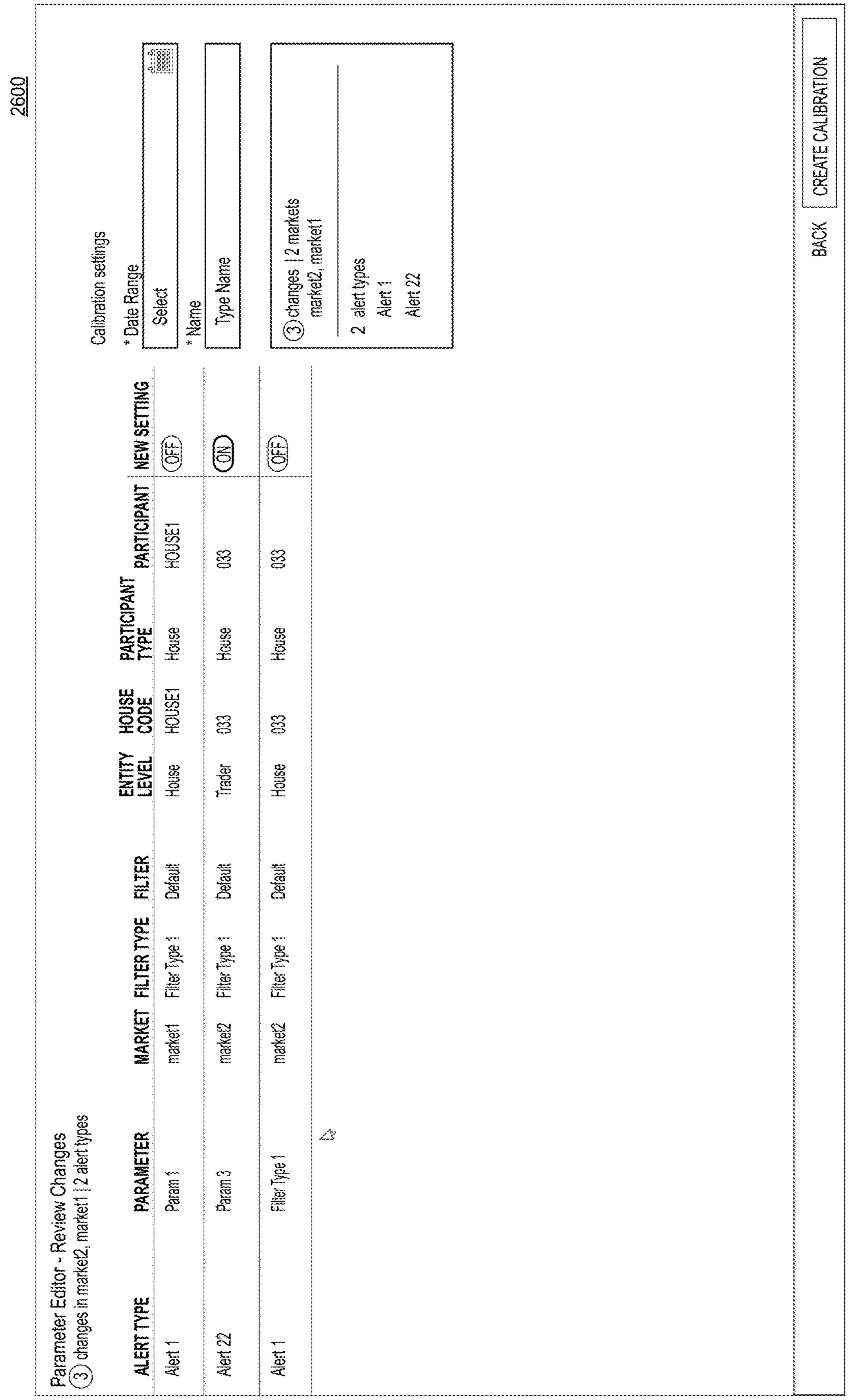
FIGS. 26-28 show example interface screens that provide for reviewing pending alert parameter configuration changes and testing such changes, according to some embodiments.
Figure 27:
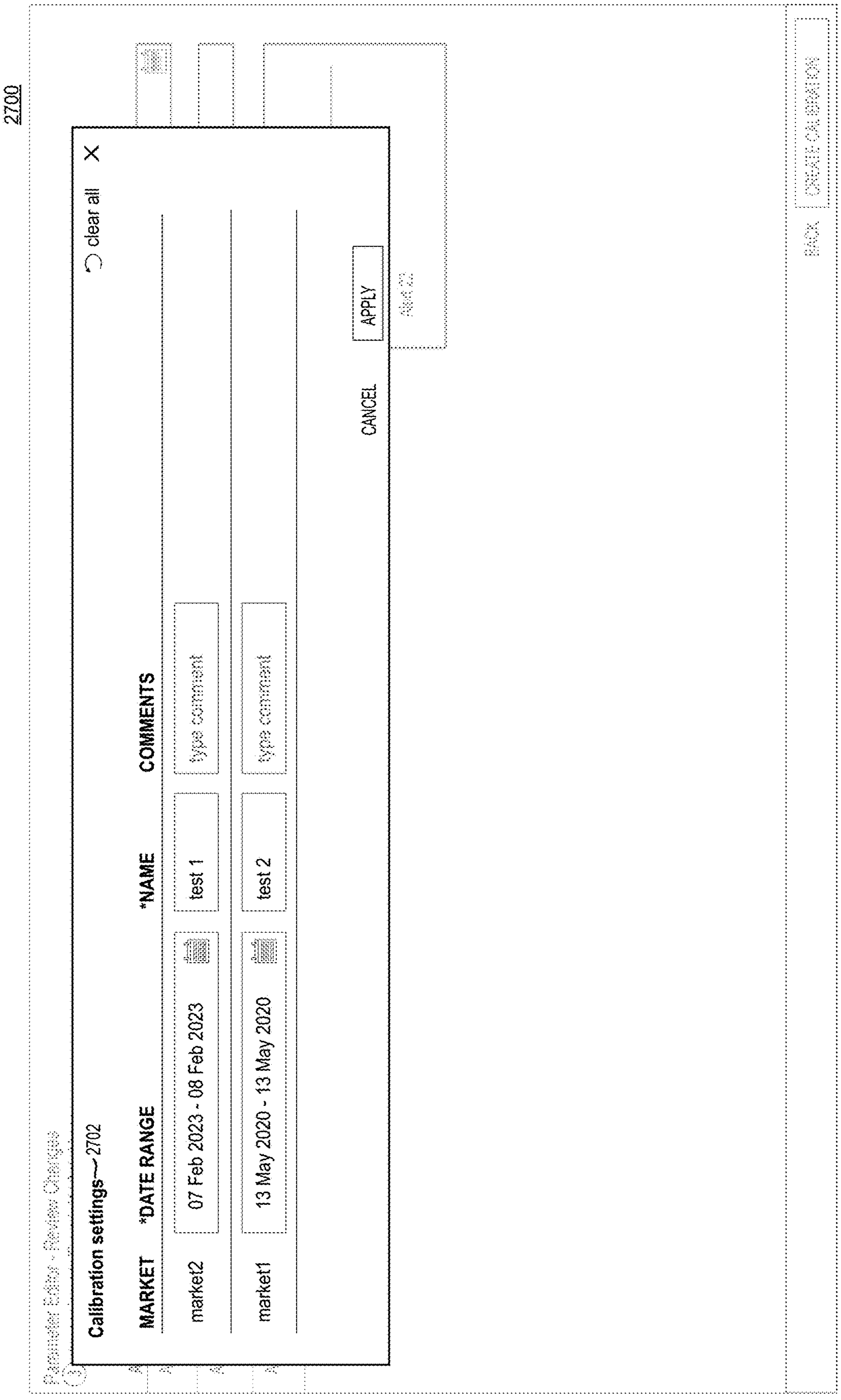
Figure 28:
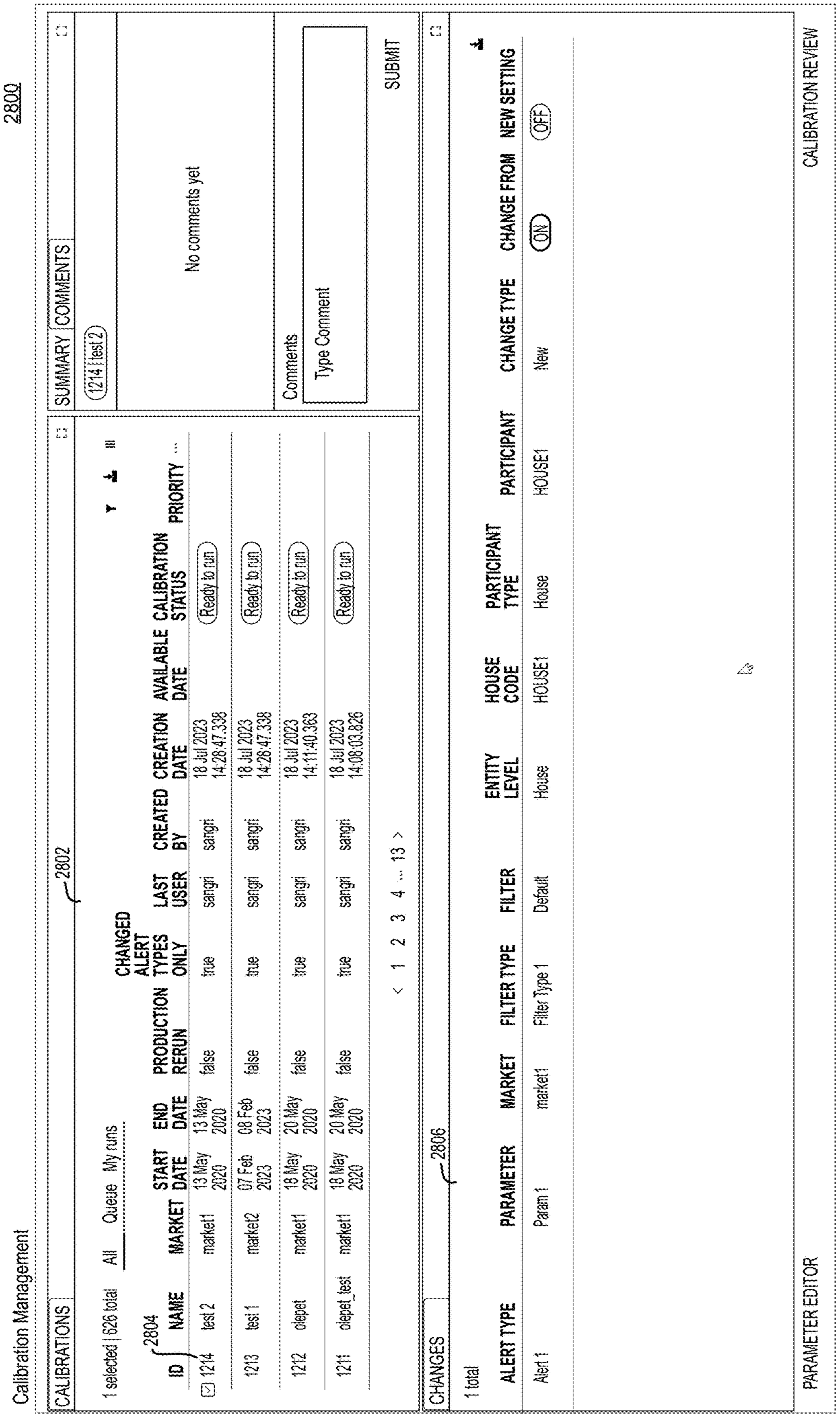
Figure 29:
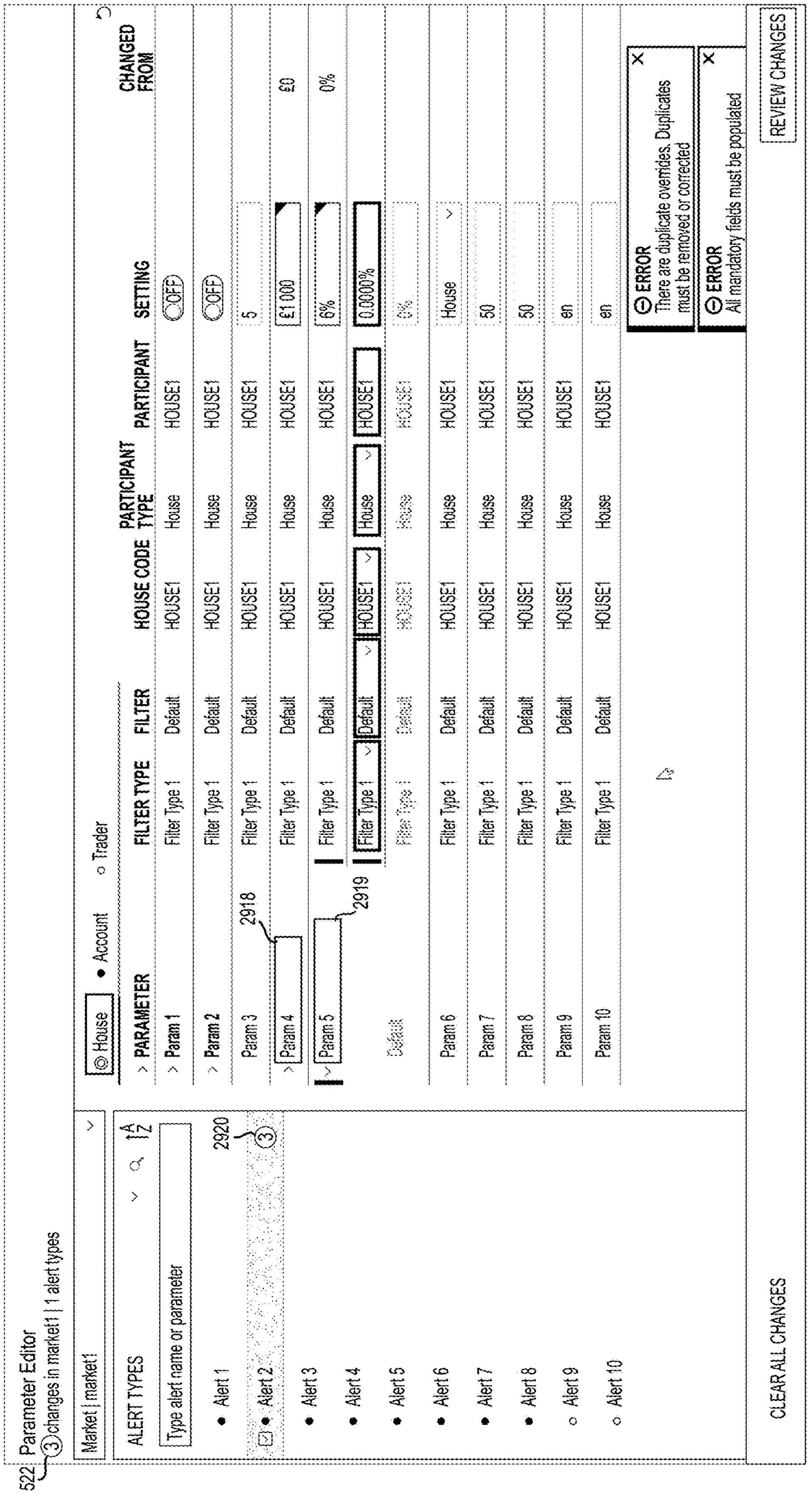
FIG. 29 shows a validation screen that enables the operator to quickly visualize and identify the cause of errors in specified configurations, according to some embodiments.

Some embodiments further facilitate reliable alert configuration by, enabling the operator to review and test any pending configuration change in an efficient manner. FIGS. 26-28 show example interface screens that provide for reviewing pending alert parameter configuration changes and testing such changes, according to some embodiments. FIG. 29 shows a validation screen that enables the user to quickly visualize and identify the cause of errors in specified configurations, according to some embodiments.

Figure 30:
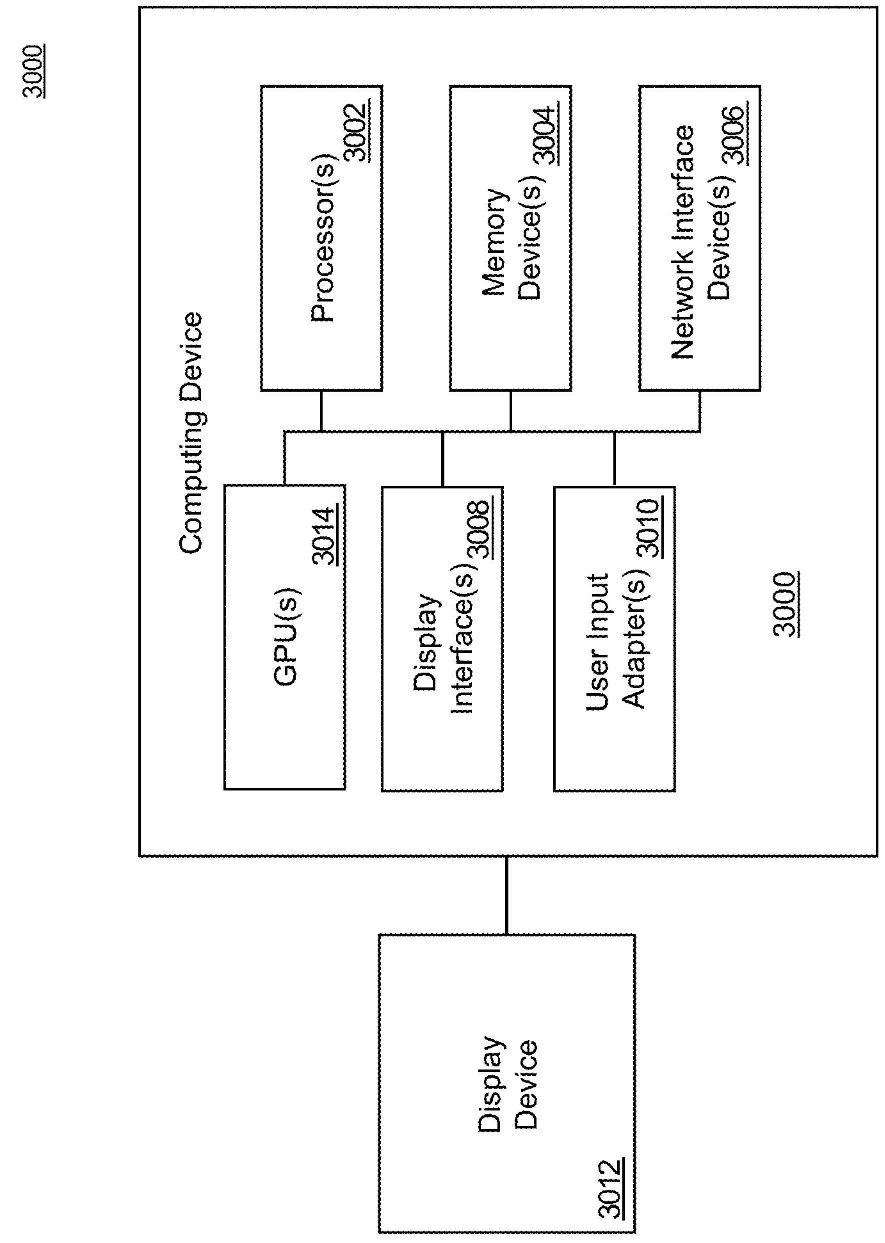
FIG. 30 shows an example computing device that may be used in some embodiments to implement features described herein.

FIG. 30 shows an example computing device that may be used in some embodiments to implement features described herein.

In many places in this document, software (e.g., modules, software engines, processing instances, services, applications and the like) and actions (e.g., functionality) performed by software are described. This is done for ease of description; it should be understood that, whenever it is described in this document that software performs any action, the action is in actuality performed by underlying hardware elements (such as a processor and a memory device) according to the instructions that comprise the software. Such functionality may, in some embodiments, be provided in the form of firmware and/or hardware implementations. Further details regarding this are provided below in, among other places, the description of FIG. 30.

Description of FIG. 1

FIG. 1 shows an example surveillance alert configuration and management computer system 100 that monitors one or more electronic securities trading systems 108*a*, 108*b* and 108*c* (collectively 108), according to some embodiments. Computer system 100 includes at least one or more server devices such as server device 102 and one or more client devices such as client device 104. The server device 102 executes a surveillance alert configuration application 112 to control the configuration of alerts (e.g., surveillance alerts) for monitoring the electronic trading systems 108. The configurations are stored in an alert parameter database 114. The server device 102, in some embodiments, may be connected to the respective electronic securities trading systems 108 via the internet or other network connections 107*a*, 107*b* and 107*c* (collectively 107).

An operator (not separately shown in FIG. 1) interacts with an alert configuration user interface 116 displayed in a browser 106 running on the client device 104. The alert configuration user interface 116 is displayed on a screen of the client device 104 by the browser 106, and enables the operator to access, view, modify, add, and/or delete parameters for alerts stored in the alert parameter database 114 through communication with the surveillance alert configuration application 112 running on the server device 102. The alert configuration interface 116 running in the browser 106 may communicate with the surveillance alert configuration application 112 using HTTP, JSON, and/or other web application communication protocols.

The client device 104 includes a memory storing a configuration parameter store 118 that is used by the alert configuration interface 116 during operator interactions with the interface. In some embodiments, the configuration parameter store 118 is populated with all the relevant alert parameters and the associated information from the alert parameter database 114 when the alert configuration interface 116 is instantiated in the browser. In some embodiments the parameter store 118 is a data structure that includes a copy of the database 114, or selected information of the database 114. In some embodiments, the alert parameter information can be requested by the alert configuration interface 116 and obtained from the surveillance alert configuration application 112 when required based on user input.

The client device 104 may be geographically remote from the server device 102 and may be connected via the internet or other network connection 110. In some embodiments, server device 102 includes its own display or connects to an external display on which the alert configuration user interface 116 can be displayed.

Each of the real-time electronic securities trading systems 108 may include a matching engine on which a large volume or securities or other instruments are transacted at very high throughput. As is well known, systems such as system 108 have numerous stringent performance, reliability and security requirements. Performance requirements include minimizing any downtime of the electronic trading system and enabling high throughput and high transaction execution speeds. Reliability and security requirements include, among other aspects, monitoring and responding to suspicious activity (e.g., abnormal activity) by market participants.

The surveillance alert configuration and management computer system 100 may be used to, based on monitoring the events associated with one or more market participants on the one or more electronic securities trading systems 108 in real-time and/or in non-real time, provide operators (e.g., analysts or other users of the system 100) with the necessary information to rapidly respond to various events that can adversely affect the electronic securities trading systems 108. For example, when some undesirable behavior of one or more electronic securities trading systems 108 or its computer systems is detected by the operator or the computer system 100 based on alerts generated by a surveillance alert generator 120, the operator may, using the alert configuration user interface 116, review the current configurations of alerts for the affected electronic securities trading system and others on the same screen and rapidly analyze the effects of one or more configuration changes to be made to the alerts in order to efficiently narrow the possible causes of the undesirable behavior.

The surveillance alert generator 120 running on the server device 102 may receive real-time trade information from the electronic securities trading systems 108 over network connections 107 and may display trends in the real-time trade information that may indicate an undesirable behavior in any of the electronic trading systems 108. The received trade information may include the transaction (event) flow pertaining to one or more market participants at the electronic trading system. The surveillance alert generator 120 can, in response to trade information and other information received from the electronic trading systems 108, generate an alert whenever an abnormal event occurs. Example abnormal events which may trigger the generation of alerts configured by computer system 100 may include, but are not limited to, an abnormally high or abnormally low price shifts of a security instrument, abnormal volume of a single transaction or a group of transactions, or various other known abnormal transaction patterns for a security instrument. In some examples, in addition to transaction pattern-related events being monitored, the surveillance application 120 may also monitor for abnormal delays in transaction execution, completion, etc. that may be indicative of system processing performance issues or system memory issues. The surveillance alert generator 120 itself, or another application, may obtain generated alerts, process the alerts, and provide for displaying a surveillance alert user interface (not shown separately) on which operators can monitor and/or respond to such alerts by, for example, configuring or reconfiguring a set of alert parameters using the alert configuration user interface 116.

The operator may, in response to trends displayed based on the real-time trade data and/or alerts generated by the surveillance alert generator 120, view and configure alert parameters to dynamically adapt the set of surveillance alerts that is deployed on the data of at least at the affected market. In some embodiments, in addition to trade information (e.g., buy/sell orders, completed transactions, trade volume information, order book status), other information such as system resource status information (e.g., memory/processor status information, order processing software instance information, etc.) can be received at the server device 102 from electronic trading systems 108.

Alert parameter configuration changes that are considered or analyzed by the operator in response to triggered alerts may include a set of alerts for the same market (i.e., alerts applied to the data from one of the electronic trading systems 108), or a set of alerts that includes alerts for multiple markets (i.e., alerts applied to the data of more than one of the electronic trading systems 108). The alerts may include a set of alerts configured at a particular activation level: a house level (e.g., a trading firm-wide level within a selected market), at an account level (e.g., at the level of one or more accounts of the trading firm, on behalf of whom securities are traded), at a trader level (e.g., at the level of one or more traders who initiate trades on behalf of one or more accounts of the trading firm), etc. The parameter configuration changes to one alert may affect one or more parameters of the same alert. As described later in this disclosure, a change to one parameter of one alert, when configured by the operator, can affect other parameters and/or alerts in the same market or different markets. This increases the risk of an erroneous alert configuration that may lead to some undesirable behaviors going undetected.

The client device 104 may be configured to display the alert configuration user interface 116 on its display device and provide for operators to interact with the interface 116 through touch screen or other input devices. The client device 104 may include an alert configuration user interface generator (not separately shown) that, based on alert and alert parameter information received from the server device 102, generates and displays the alert configuration user interface 116. In some embodiments, the surveillance alert generator 120 on the server device 102 provides alert information (e.g., alerts for abnormal transactions, abnormal user actions, abnormal system behaviors, etc.) and associated trading information (e.g., trade prices, trade securities instrument information, simple moving average information, threshold bands for securities, etc.) to an alert configuration user interface generator (not shown separately) that displays the generated alerts and corresponding trade and/or system information to the operator. The operator, in response to displayed alerts and corresponding trade and/or system information, may use the alert configuration user interface 116 to configure and/or reconfigure one or more alerts to better detect causes any abnormality indicated by the displayed alerts.

The server device 102 is not limited to one computer, and may comprise a plurality of computers. Although only one client device 104 is shown, it is understood that any number of client devices 104 may connect to the server device 102. Moreover, the number of electronic trading systems 108 is not limited in embodiments of this disclosure.

The example embodiments are primarily described in relation to surveillance of an electronics securities trading system such as, for example, the electronic securities trading system 108 and the monitoring of securities instruments or user actions associated with such securities instruments. However, embodiments are not limited to electronic securities trading systems, and may apply to surveillance of any characteristic that can be monitored over time in a transaction processing system or the computer systems associated with the transaction processing system.

Description of FIG. 2

FIG. 2 illustrates an alert parameter database, such as, for example, the alert parameter database 114 shown in FIG. 1, that is stored in the server device 102, according to some embodiments. The alert parameter database 114 stores respective sets of alert parameters 202*a*, 202*b* and 202*c* (collectively 202) that each comprises the alert parameters and the information associated with the alert parameters for one of the electronic securities trading systems 108.

Each of the sets 202 may comprise a set of applied configurations (e.g., 204*a*, 204*b* or 204*c*, collectively 204) and a set of unapplied (pending) configurations (206*a*, 206*b* and 206*c*, collectively 206). The applied configurations comprise alert parameters for which the overrides have been committed to database 114 as the parameter values that are deployed in the electronic securities trading systems 108. The unapplied configurations comprise alert parameters for which the overrides have not been committed to database 114. In some embodiments, the unapplied configurations 206 are partially completed configurations from the browser 106.

A default set of alert parameter configurations 208 may be stored so that it is available to be used by the alert configuration user interface 116 to, for example, deploy a set of surveillance alerts to a new electronic securities trading system 108.

Description of FIG. 3

FIG. 3 shows a flowchart of a process 300 for configuring alert parameter surveillance information including generated alerts on a system such as the computer system 100 of FIG. 1, according to some embodiments. Process 300 may, for example, be performed by the surveillance alert configuration application 112 running on the server device 102, and the surveillance alert configuration user interface 116 at the client device 104. The processing systems of server device 102 and client device 104 may run process 300 thereby providing for displaying the surveillance alert configuration user interface 116 on a display on the client device 104. The surveillance alert configuration user interface screen 400 shown in FIG. 4 may be an example of a surveillance alert configuration user interface screen generated in process 300.

Process 300 may begin at operation 302. An operator at client device 104 starts up a surveillance alert parameter configuration application in a browser, which causes, at operation 302, the surveillance alert configuration application 112 running on the processing system of the server device 102 to retrieve alert configuration parameters from the alert parameter database 114.

At operation 304, the surveillance alert configuration user interface 116 running in browser 106 at the client device receives the set of alerts and alert parameter configuration information from the server device, and generates the surveillance alert configuration user interface screen (e.g., screen 400).

At operation 306, the operator interacts with the displayed surveillance alert parameter configuration screens to change configurations (e.g., override) of one or more parameters of one or more of the alerts.

At operation 308, the surveillance alert configuration user interface 116 and the surveillance alert configuration application 112 operate to apply the alert parameters including the overrides to the active alert configurations. The active alert configurations are stored in database 114. The surveillance alert configuration application may apply the active alert configurations to one or more of the electronic securities trading systems 108.

It should be appreciated that process 300 is an example, and in various embodiments one or more operations may be combined with other operations, performed in an order other than that shown in FIG. 3, or may be omitted while displaying alerts on the user interface.

Description of FIG. 4

FIG. 4 shows an example surveillance alert configuration user interface screen 400 that is displayed by the browser 106 on client device 102, according to some embodiments of the present disclosure. The operator may use the screen 400 to override the value of one or more parameters. The one or more parameters may be from one alert or from more than one alert. The alerts may be from the set of surveillance alerts of one market or from more than one market.

Screen 400, and other screens displayed during the operator interaction, enable the operator to quickly visualize the effects any one or more parameter overrides would have on alert configurations throughout the electronic securities trading systems 108 for which the transactions/events associated with one or more market participants are monitored by the computer system 100.

Screen 400 includes a market selector 402 to select or configure the market, a set of alerts 404 for the selected market, a level selector 407 to select the level of activation of the alerts, and an alert search field 417. For an alert that is currently selected in area 404, the set of parameters 406 is displayed. For each parameter of the selected alert 405, the parameter name 408, filter type 409, filter 410, house code 411, participant type 412, participant 413, setting/value 414, setting/value changed from (i.e., previous setting/value) 415, and the change type 416 may be shown.

Description of FIG. 5

FIG. 5 shows a screen 500 that may be displayed by browser 106 when the operator changes the configured value or setting 524 of a selected parameter 518 of the selected alert 405, according to some embodiments.

When the value/setting 524 for the selected parameter 518 "Param4" from the previous value $0 to a new value $1000, the new value is shown in the settings field 524 and the previous value is shown in the previous value/setting field 526. A change type field (column 416) may indicate that this is a new override and another selectable field may provide for a pull-down list of various other information and/or configuration options for the selected parameter 518. A popup message (e.g., the popup shown with "Changed from $0") may be shown in association with the settings field 524 to more clearly show the previous value of the setting to facilitate fast and reliable override specification for the selected parameter 518.

Importantly, in response to the operator input overriding the setting/value 524 of the selected parameter 518, the alert configuration user interface 116 updates the screen 500 to display a parameter changes for alert counter 520 to show the number of parameters in the selected set of parameters 408 of the selected alert 405 for which overrides are specified, and a total changes counter 522 showing the number of parameters among all alerts in the set of alerts 404 of the currently selected market 402 (currently "market1").

An affected markets indicator 501 indicates the markets that have alerts that have overridden parameters. For example, in screen 500, indicator 501 illustrates that the changes are in the "market1" market. An affected alert types counter/indicator 503 indicates which alert types have at least one alert with overridden parameters. In screen 500, for example, affected alert types counter/indicator 503 indicates that there is only one type of alert that is affected by pending parameter overrides.

The screen 500 may also provide options to clear all changes 528 and to review changes 530. By selecting the clear all changes 528 option, the operator may undo all pending changes shown in the current screen. The review changes 530 selection enables the operator to review the pending changes of the parameters of alerts.

Description of FIGS. 6A-B

FIGS. 6A and 6B illustrate example pseudocode for a data structure storing alert and alert parameter information that is configurable, for example, using the alert configuration user interface 116, in accordance with some embodiments of the present disclosure.

Data structure 602, "parameter editor", is configured to store available configurations for the parameters of alerts configured on computer system 100 for one or more electronic trading systems 108. The data structure 602 may be provided by the surveillance alert configuration application 112 to the alert configuration user interface 116 and may be stored in the configuration store 118 in the memory of the browser 106.

Data structure 602 is configured to maintain a copy of the initial parameter values for all alerts of one or more markets. A sub-object "initial" 603 may store the initial values for all alerts of the selected market. The initial values (e.g., 614) may be stored per parameter 612, within per activation level 610, within per alert 608, and within per market 606.

During the user interactions to reconfigure one or more alerts, the changes (overrides) to the parameters of the alerts are stored in another sub-object, "changes" 604. Each change is stored as a separate entry.

FIG. 6A shows a portion of the data structure 602 before any pending configuration changes have occurred. Therefore, the changes 604 subobject is not populated.

In contrast, FIG. 6B shows the data structure after a pending configuration change has occurred, causing the affected parameter to be stored in changes 604. For example, under changes 604, two configuration rows 634 and 636 are stored within the parameter "Param1" 632, within the activation level "house" 630, within the alert "Alert1" 628, and within the market "market2" 626.

Thus, when the operator configures a new setting for the "Param1" parameter of the "Alert1" alert, for which the "initial" subobject 603 already has a configuration row 614 with the unique identifier "f44af7dc-86ce-4331-a3e7-b53738df1c07", the system in response creates a copy of the configuration row 614 from the "initial" 603 subject to the "changes" 604 subobject. The copy is shown as configuration row 634 in FIG. 6B. The newly configured setting for the "Param1" parameter is stored in the newly created configuration row 636. A unique identifier ("103a70fd-ea88-4ce9-9ba5-24256873f8cc") is generated for the new configuration row, but it is related to the original (system default) configuration setting by storing the unique identifier of the original configuration setting within the new configuration row (e.g., the uuid: "f44af7dc . . . " stored within the new configuration row 636).

The data structure 602 is configured to facilitate efficient counting of the pending number of configuration changes in order to improve the operator's response times to dynamic detection of abnormal events, for example, by timely updating the appropriate interface screens to represent the impact of configuration changes that are being considered by the operator to respond to such events. For example, by storing all pending configuration changes as separate configuration rows within the "changes" subobject: the total number of pending configuration changes for the alert can be determined by counting the total number of configuration rows within the alert subobject under "changes" subobject; and the total number of pending configuration changes for all markets (i.e., for the entire computer system 100) can be determined by summing the configuration rows under each of the marker subobjects. Note that when the above total numbers of configuration rows are determined, the system default configuration rows that are also stored under the "changes" subobject are ignored, because they do not represent pending configuration changes. It should be understood that a "configuration row" may be represented as any type of data element, such as, for example, a row in a table, a sub/child object of a parent object, an entry in a list of entries, etc.

Similarly, the alert types affected by the pending configuration changes are determined by iterating for each alert subobject stored under "changes", and the affected markets are determined by iterating for each market subobject under the "changes" subobject. The above are some examples of how the configuration of data structure 602 is particularly suited for efficient display of interface screens representing pending configuration changes.

Description of FIG. 7

FIG. 7 shows a flowchart of a process 700 performed by the alert configuration user interface 116, according to some embodiments.

Process 700 starts at operation 702. At operation 702, a user configuration (e.g., override) for a parameter of an alert in the alert configuration user interface is received.

At operation 704, a new row is created in a parameter configuration table. The new and previous values are stored in two separate rows in the table.

At operation 706, counters are updated to reflect the changed number of parameters for the alert, for the market, and/or for all markets 108 monitored by the computer system 100.

At operation 708, the displayed alert configuration user interface screen is updated to reflect the counters updated at operation 706.

At operation 710, the changes are stored in a memory buffer in the browser memory. For example, the changes can be stored in an object such as that shown in FIGS. 6A-B.

It should be appreciated that process 700 is an example, and in various embodiments one or more operations may be combined with other operations, performed in an order other than that shown in FIG. 7, or may be omitted generating the plurality of alerts to be displayed.

The processes of FIGS. 3 and 7 and the data structures described in relation to FIGS. 6A-6B may be configured to provide an alert management and configuration system, such as, for example, the system 100 in FIG. 1. A memory of the system 100 may store a configuration data structure, such as that, for example, described in relation to FIGS. 6A-6B, that includes configuration parameters of a plurality of surveillance alerts for one or more electronic trading systems (e.g., electronic securities trading systems 108). System 100 may display a graphical user interface comprising the set of configuration parameters of a selected surveillance alert. Example graphical user interfaces are described in relation to screens 400, 500, 800, 900, 1000, 1100, 1200, 1300, 1400, 1500, 1600, 1700, 1800, 1900, 2000, 2100, 2200, 2300, 2400, 2500, and 2900. The graphical user interface may be displayed, for example, by browser 106 on client device 104. For each configuration parameter of the set of configuration parameters (e.g., as shown in FIG. 5, surveillance alert 405 has a set of configuration parameters 406), one or more configuration fields may be displayed on the graphical user interface.

In response to an operator changing a configuration of a first configuration parameter of a selected surveillance alert on the graphical user interface, in some embodiments the surveillance alert configuration and management system may adjust a first counter (a parameter changes for alert counter) and display the adjusted first counter in association with a name of the selected surveillance alert. The first counter is configured to track a number of pending configuration changes associated with the selected surveillance alert. The system may also, in response to the changing of the first configuration parameter, adjust a second counter (a total changes counter) and display a name of at least one of the electronic trading systems in association with the second counter, concurrently with displaying the adjusted first counter. The second counter is configured to track a total number of pending configuration changes associated with the electronic trading systems. Screen 500 (shown in FIG. 5) illustrates a counter 520 that tracks the number of pending configuration changes associated with a particular alert, and a total changes counter 522 that tracks the total number of pending configuration changes associated with the electronic trading systems monitored by, for example, system 100.

The system may, in response to changing the configuration of a configuration parameter of a selected surveillance alert, insert a new configuration row in the configuration data structure. Then, adjusting of the first counter may be based on a counting of corresponding inserted new configuration rows in the configuration data structure. The configuration data structure may be configured to arrange initial values of the set of parameters and changed values thereof in respective different storage hierarchies (e.g., sub-hierarchies rooted at 603 and 604, respectively, as shown in FIG. 6B). The counting of inserted new configuration rows in the configuration data structure may be performed by counting the new configuration rows inserted/added in the storage hierarchy of changed values.

The configuration data structure may include a respectively different hierarchical data structure for each market (e.g., electronic trading system), for example, at 606 shown in FIG. 6B. Within the hierarchical data structure for a market, each alert of a set of alerts may be represented by a respectively different hierarchical data structure. Adjusting of the second counter may be performed by counting new configuration rows inserted/added in the hierarchical data structures corresponding to the markets in the storage hierarchy of changed values.

In response to the changing of a first configuration parameter, in some embodiments the system may also adjust a third counter (affected alert types counter/indicator) and display the third counter in association with one or more markets. The third counter is configured to track a number of surveillance alerts that have at least one pending configuration change. The affected alert types counter/indicator 503 in FIG. 5 is an example of a counter configured to track a number of surveillance alerts that have at least one pending configuration change. The number of surveillance alerts that have at least one pending configuration change may be determined by counting the hierarchical data structures representing respective alerts in the storage hierarchy of changed values.

In some embodiments, the configuration data structure may store information of parent-child relationship between pairs of configuration parameters. In response to the changing of a parent configuration parameter via the graphical user interface, the system may automatically adjust a respective first counter associated with each of the sets of configuration parameters that inherits from the parent configuration parameter and automatically adjust the second counter and the third counter. At least one of the sets of configuration parameters that inherits from the parent configuration parameter may be associated with another surveillance alert. The other surveillance alert may be configured for another market. Example, parent-child relationships between configuration parameters is described in relation to FIG. 23.

In some embodiments, the graphical user interface may have three display areas: a first display area displaying a name of the electronic trading system, a second display area displaying a plurality of surveillance alerts of the electronic trading system, and a third area displaying the plurality of configuration parameters of the selected surveillance alert. In response to the changing of a configuration parameter, at least one update may be made in each of the three display areas. In some embodiments, the graphical user interface includes a fourth display area displaying a plurality of activation levels (e.g., activation area 407) of which one activation level is associated with the displayed plurality of configuration parameters, and in response to the changing of the configuration parameter, the fourth display area may also be updated.

In some embodiments, a respective enable indicator is displayed in association with an activation level in the fourth display area and with each set of parameters displayed in the second display area. The enable indicator associated with the activation level indicates whether at least one of the displayed sets of parameters is enabled for that activation level and the enable indicator associated with a set of parameters indicates whether that set of parameters is enabled for the market.

In response to changing a first configuration parameter, in some embodiments the surveillance alert configuration and management system may change an appearance of at least one of a first field and a displayed name of the first configuration parameter concurrently with displaying the adjusted first counter. The system may also change an appearance of a displayed name of an activation level associated with the first configuration parameter. The activation level may be one of a plurality of activation levels, each of which is associated with one or more configuration parameters.

In response to changing a first configuration parameter, in some embodiments the system may display a value of the first configuration parameter after the change, a value of the first configuration parameter before the change, and a type of the change.

In response to changing the configuration of a second configuration parameter, in some embodiments the surveillance alert configuration and management system may validate the changes to the second configuration parameter and, in response to failing the validation, the system may change the appearance of at least one of the fields of the second configuration parameter, a displayed name of the second configuration parameter, and a name of the market. In response to changing the configuration of the second configuration parameter of the selected set of parameters and in response to failing the validation, the system may change the appearance of at least one of the fields of another configuration parameter. The validation detects the other configuration parameter as a duplicate of the second configuration parameter.

In response to changing a configuration of a second configuration parameter via the graphical user interface and in response to a failing of the validation, in some embodiments the system may change an appearance of a displayed name of a surveillance alert associated with the second configuration parameter, where the surveillance alert is associated with one of a plurality of surveillance alerts each of which is associated with one or more configuration parameters. An example validation in some embodiments is described in relation to FIG. 29.

Description of FIG. 8

FIG. 8 shows another alert configuration user interface screen 800 that is displayed when the operator, in addition to having overridden a first parameter 518 (shown in FIG. 5), overrides a second parameter 819 of the same alert 405 “Alert2”.

The parameter changes for alert counter 520 shows that the selected alert 405 “Alert2” has two of its parameters being overridden with user specified values.

Additionally, a second counter, a total changes counter, 522 shows that the number of parameter overrides for all alerts of the currently selected market is 2. The affected markets indicator 402 indicates that both overridden parameters are from the “market1” market and the affected alert types counter/indicator 503 indicates that both overridden parameters are from one alert type (e.g., both overridden parameters 518 and 819).

Figure 9:
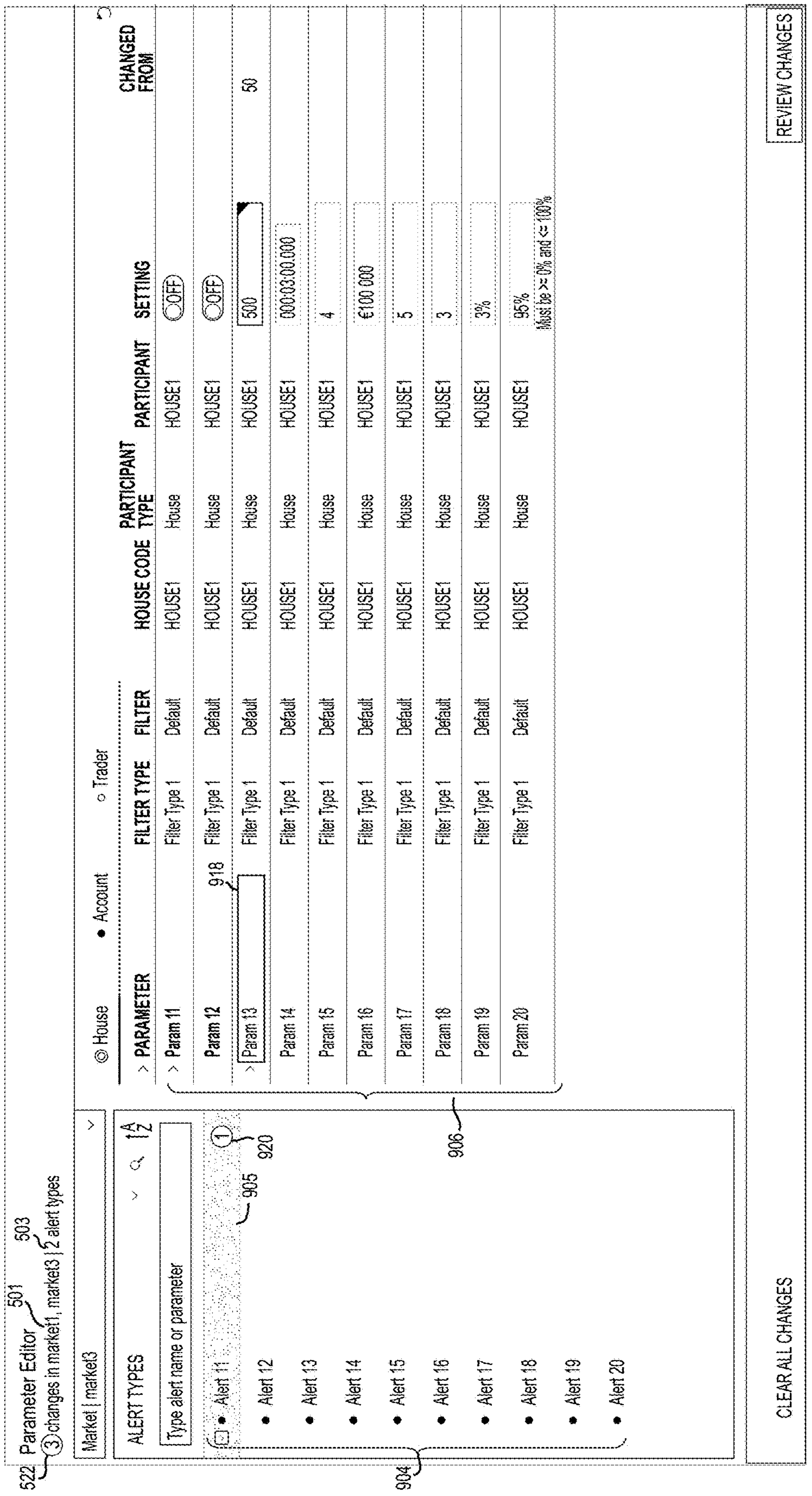
FIGS. 9-11 illustrate the effect of changing a parameter setting of an alert in multiple markets, and reversing changes, according to some embodiments.

Description of FIGS. 9-11

Following after the scenario of FIG. 8, FIGS. 9-11 illustrate the effect of changing a parameter setting of an alert in another market, and then reversing that change.

FIG. 9 shows an alert configuration user interface screen 900 that is displayed when the operator, in addition to having overridden a first parameter 518 and a second parameter 819 in the market “market1” as shown in FIG. 8, overrides a third parameter 918 in another market “market3”.

The third parameter 918 is a parameter in the set of parameters 906 of the selected alert 905 “Alert11” in the set of alerts 904 of the newly selected market “market3”.

The parameter changes for alert counter 920 for the selected alert 905 indicates that one of its parameters has been overridden. The total changes counter 522 indicates a total of 3 overrides are pending. The affected markets indicator 501 indicates that the overridden parameters are in the “market1” and “market3” markets. The affected alert types counter/indicator 503 indicates that the overridden parameters are from two different alert types (in this example, two alerts).

Figure 10A:
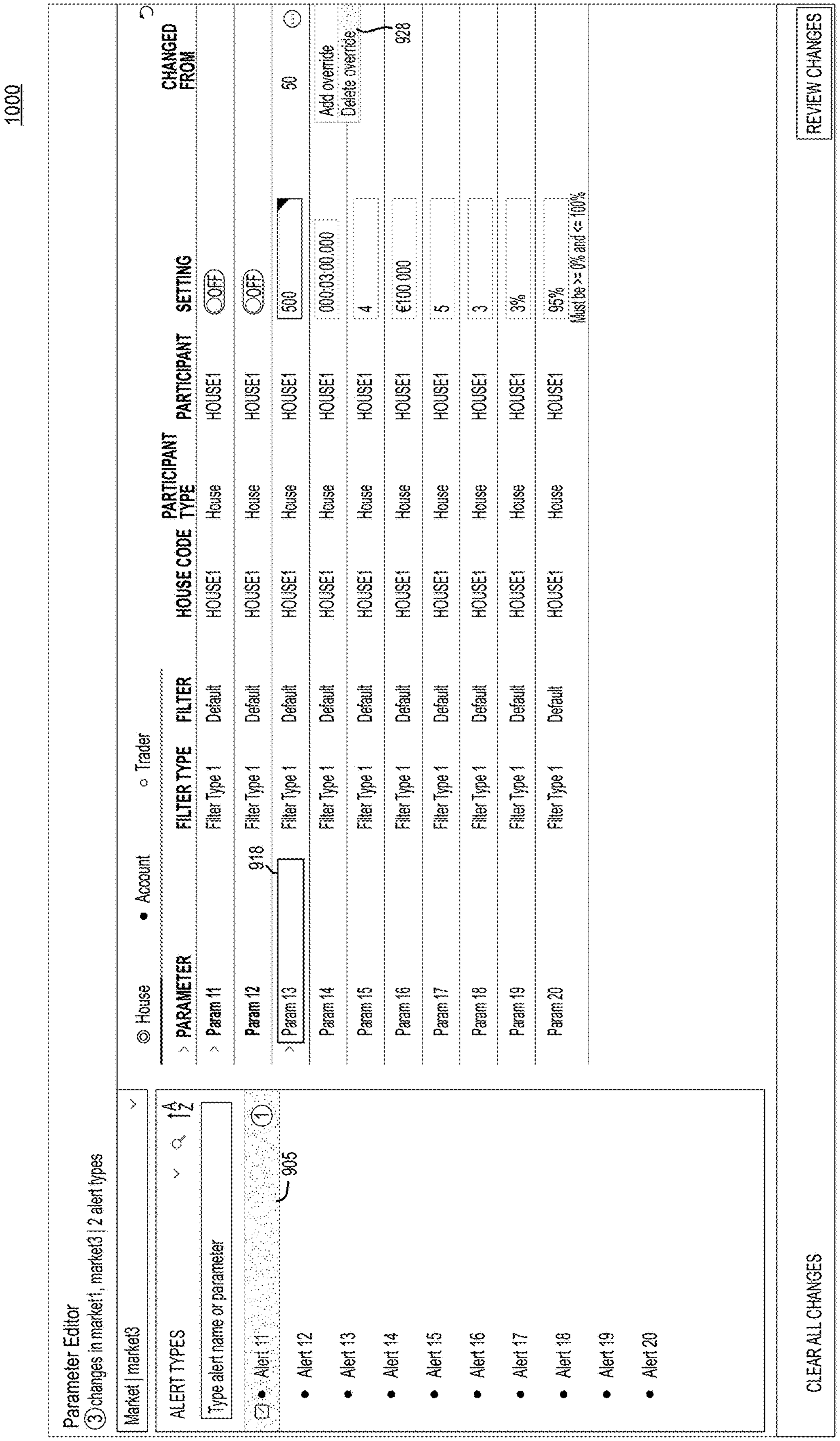

FIG. 10A shows an example when an override is deleted. Screen 1000 is displayed when the operator, when in screen 900, initiates deletion of the override of selected parameter 918 by, for example, right-clicking on the setting/value field for the selected parameter. A popup menu 928 is displayed in response to the right-clicking, and the operator selects the delete override option. The result from selecting to delete override in the selected parameter 918 is shown in FIG. 11A.

Figure 11A:
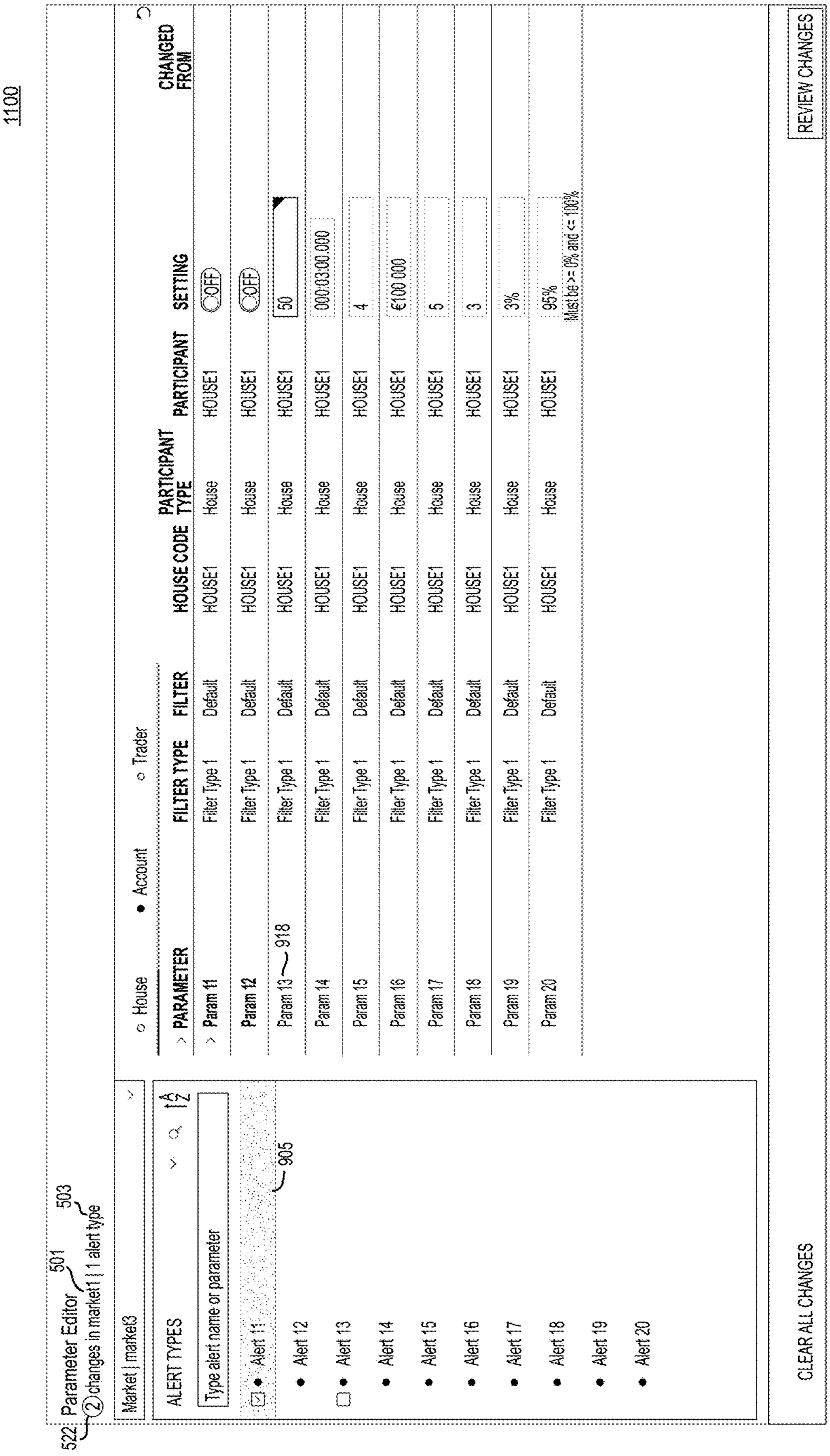
Figure 12:
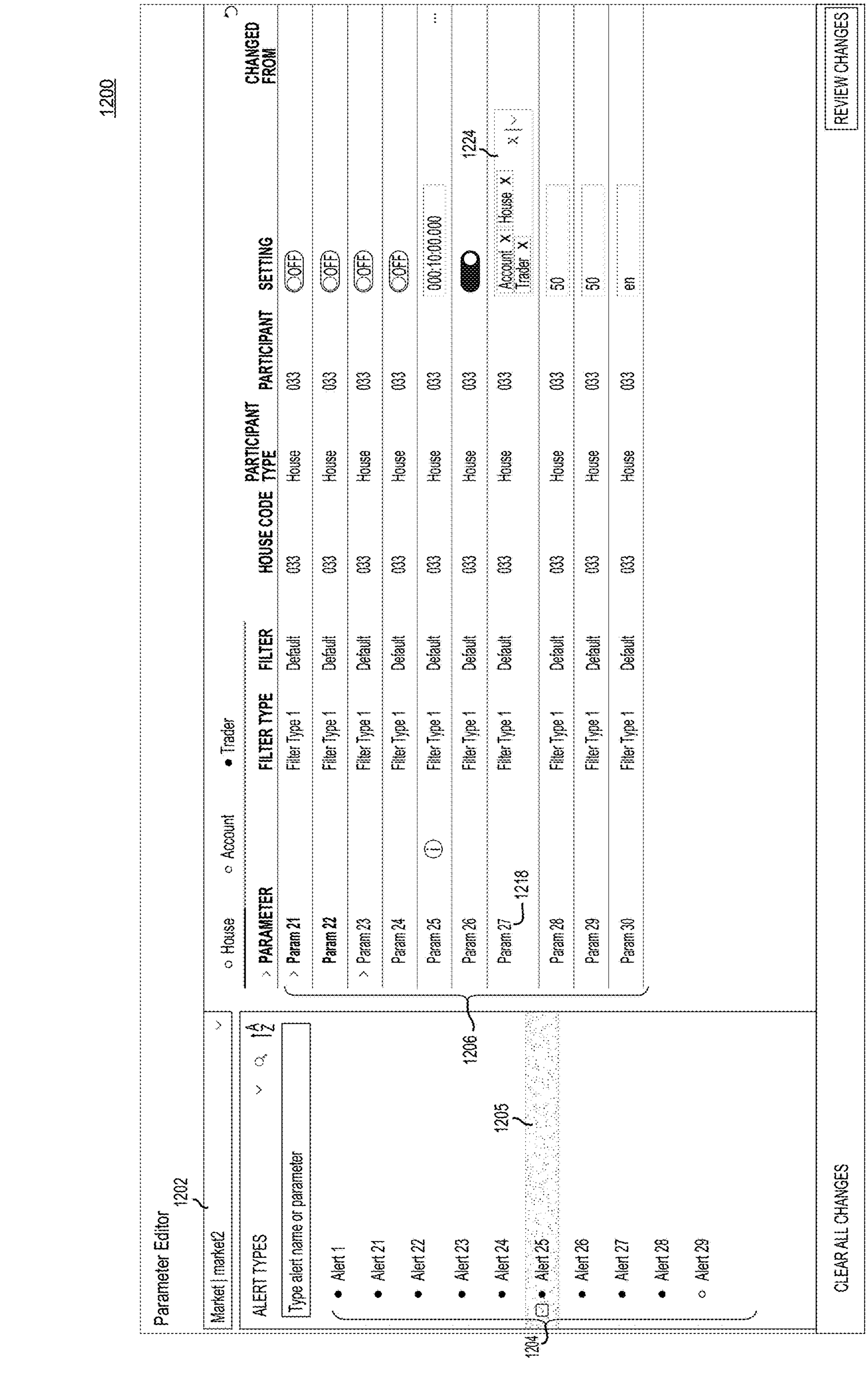
FIG. 12 illustrates an example of a multiselect capability, according to some embodiments.

FIG. 11A shows an example screen 1100 displayed when the delete override of the selected parameter 918 is complete. Whereas in screen 1000 the override is 500 and the previous setting/value is 50, in screen 1100 it is shown that the override is 50. The parameter changes for alert counter 920 for the selected alert 905 “Alert11” is no longer displayed because the alert has no other parameters that are overridden. The total changes counter 522 is reduced by 1 from that seen in screen 1000. The reduction is due to the delete override of the parameters of the selected alert 905. The affected markets indicator 401 now indicates only “market1” (whereas in screen 1000, it also indicated “market3”) and the affected alert types counter/indicator 503 indicates that only 1 alert type is affected (whereas in screen 1000, it indicated 2 alert types).

Figure 10B:
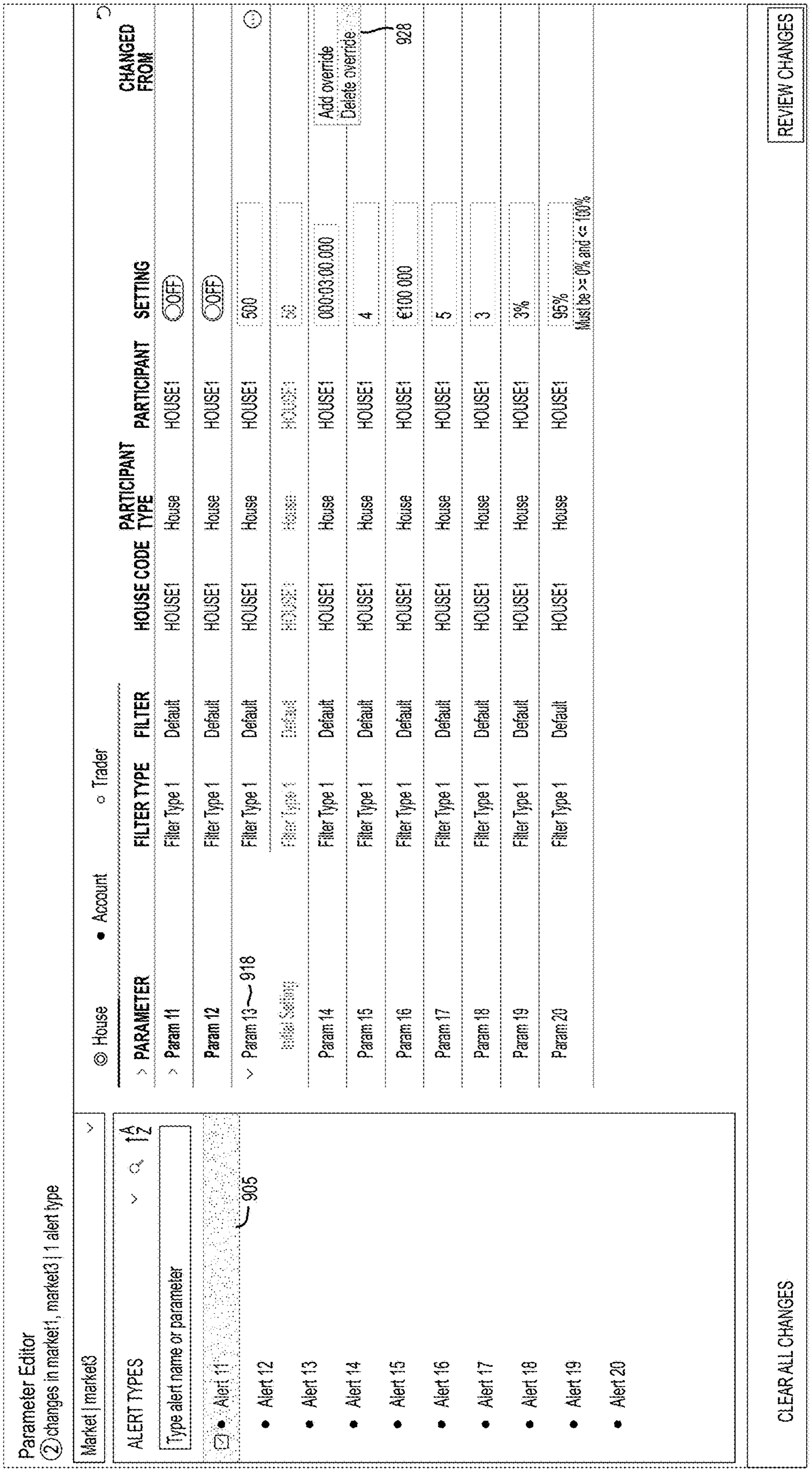
Figure 11B:
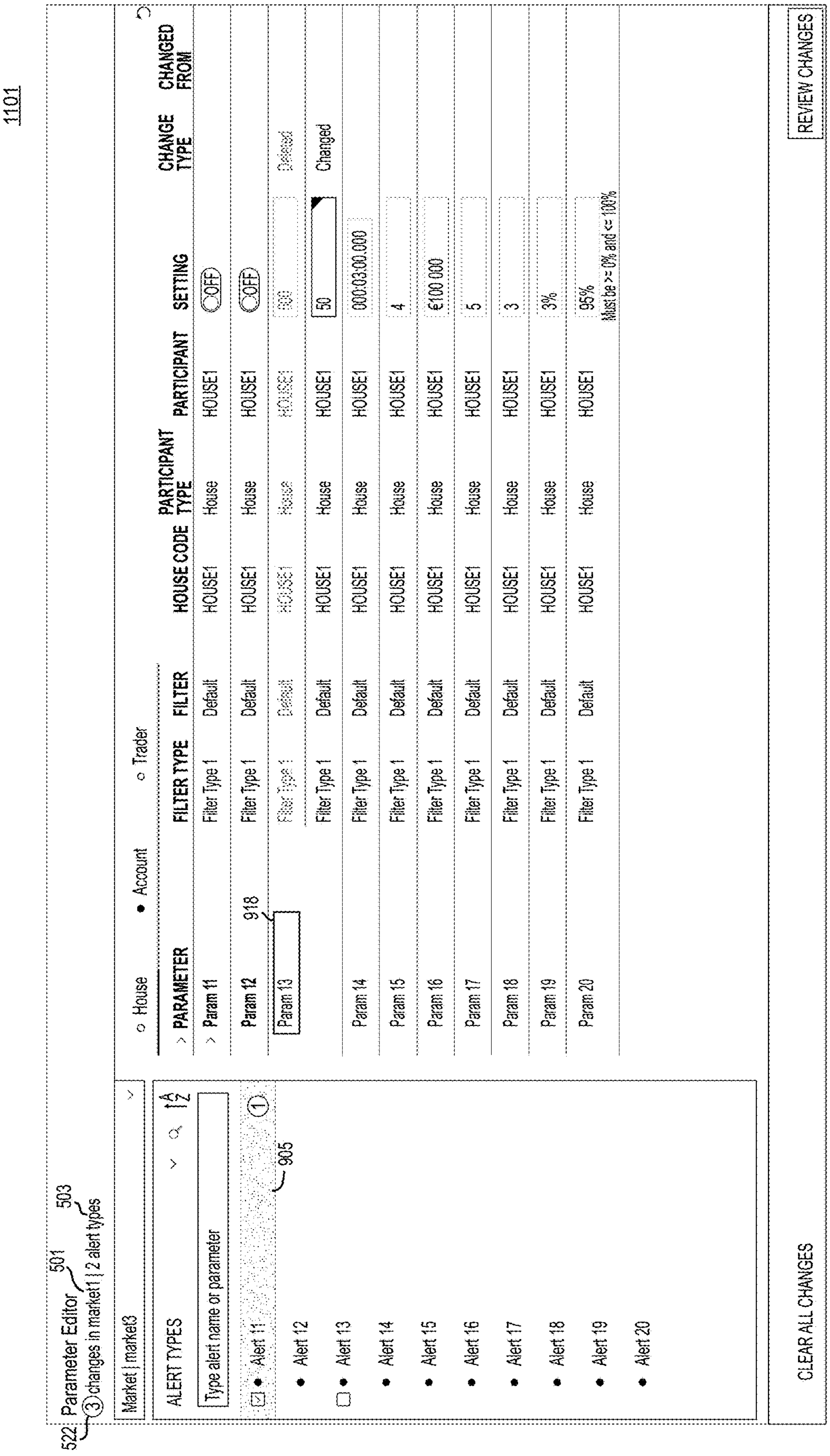

Whereas FIGS. 10A and 11A illustrated an example of a pending configuration change being deleted, FIGS. 10B and 11B illustrate an existing configuration being deleted. In FIG. 10B, screen 1001 shows “Param13” parameter 918 having two configurations—the currently active configuration of a “500” value in settings and the initial setting (which is currently not active) of a “50” value in settings. In this screen 1001, if the operator selects "delete override" from menu 928, screen 1101 shown in FIG. 11B may be obtained. In screen 1101, the two configuration rows of "Param13" are still shown, but with the setting value of "500" indicated as "deleted" in the change type column, and the initial setting of "50" being indicated as "changed" an active. The counter associated with "Alert11" and counter 522 are updated to indicate the pending change. Additionally, counter 503 too may be updated as appropriate.

Description of FIG. 12

FIG. 12 illustrates an example of a multiselect capability, according to some embodiments. The alert configuration user interface screen 1200 illustrates the set of alerts 1204 configured for the market "market2" specified in the market selector 1202. The alerts in the set 1204, except for the "Alert29" alert, are enabled for this market, as indicated by the solid circles to the left of all alerts in the set 1204 except for "Alert29" which has an empty circle to its left. The set of parameters 1206 is configurable for the selected alert 1205. The multiselect capability is illustrated in the setting field 1224 of the "Param27" parameter 1218. The multiselect capability enables the selection, for example, from a drop-down list of valid values, one or more values as the value for the settings field. When multiple values are entered for the setting of a particular alert parameter, the triggering of the alert will evaluate the particular parameter by an "or"-condition of the multiple values. That is, when evaluating whether the alert is to be triggered, the "Param27" parameter will evaluate to true if any one of its multiple values is satisfied.

Description of FIGS. 13-21

FIGS. 13-21 show further examples of changing a default parameter setting, deleting or adding overrides, types of overrides, and the effect of changes to parameter settings at different levels of activation, according to some embodiments.

Figure 13:
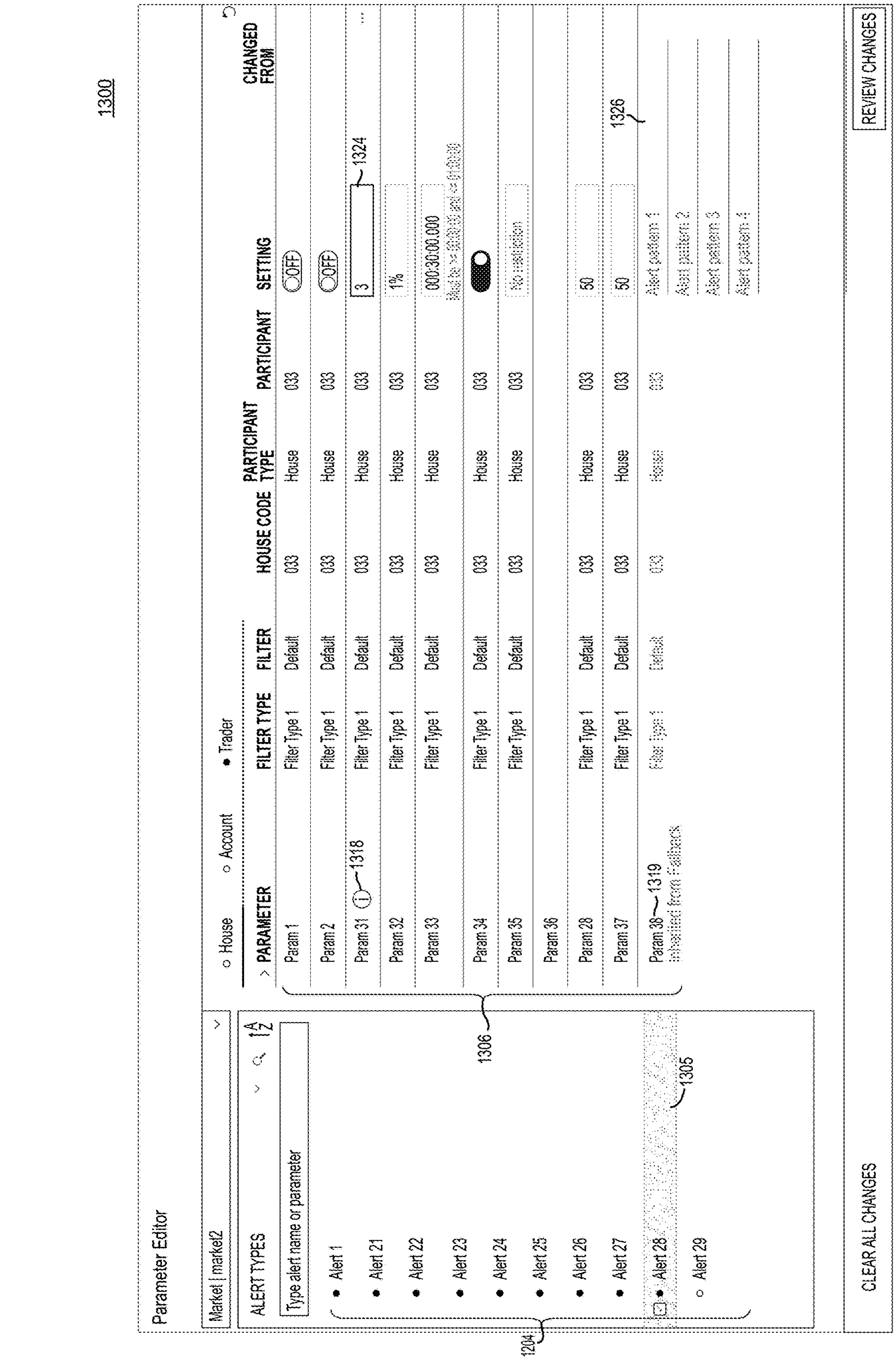
FIGS. 13-21 show examples of changing a default parameter setting, deleting or adding overrides, types of overrides, and the effect of changes to parameter settings at different levels of activation, according to some embodiments.

FIG. 13 shows a screen 1300 in which the alert "Alert28" 1305 is selected from the set of alerts 1204. The selected alert's set of parameters 1306 is shown. No parameters are currently having pending overrides. For example, there are no parameter changes for alert counter or total changes counter that is displayed on screen 1300. The "Param31" parameter 1318 is still only configured for its default setting 1324.

Screen 1300 also illustrates an example of a parameter 1319 for which the setting, shown as the multiple settings (multiselect) 1326, is provided.

Figure 14:
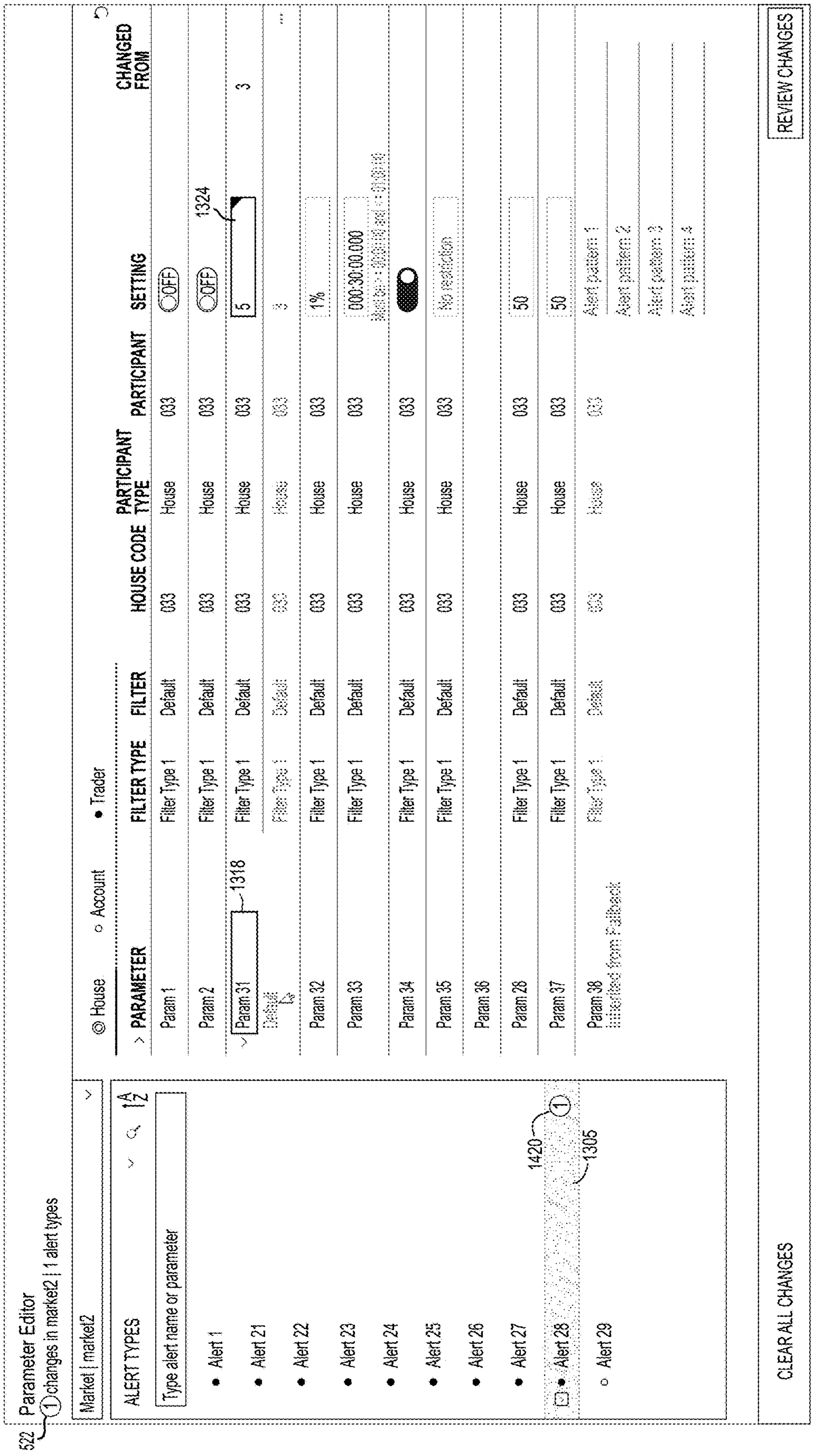

FIG. 14 shows the screen 1400 when changing the default setting of parameter 1318 "Param31" with a new value of 5 in the setting/value field 1324. In response to the user's action of changing the value in field 1324, the system automatically detects the change in field 1324 and creates a new configuration row for the new settings configuration. The system setting is in a row shown as "default" (and having the original configured setting value of 3) which may be represented on the display indicating that the default system configuration cannot be changed by the operator, and the operator is enabled to configure the new setting value in field 1324 for the new configuration row.

The parameter changes for alert counter 1420 indicates one parameter for the selected alert 1305 is changed. The total changes counter 522 is correspondingly updated, along with the changed alert type indicator.

Figure 15:
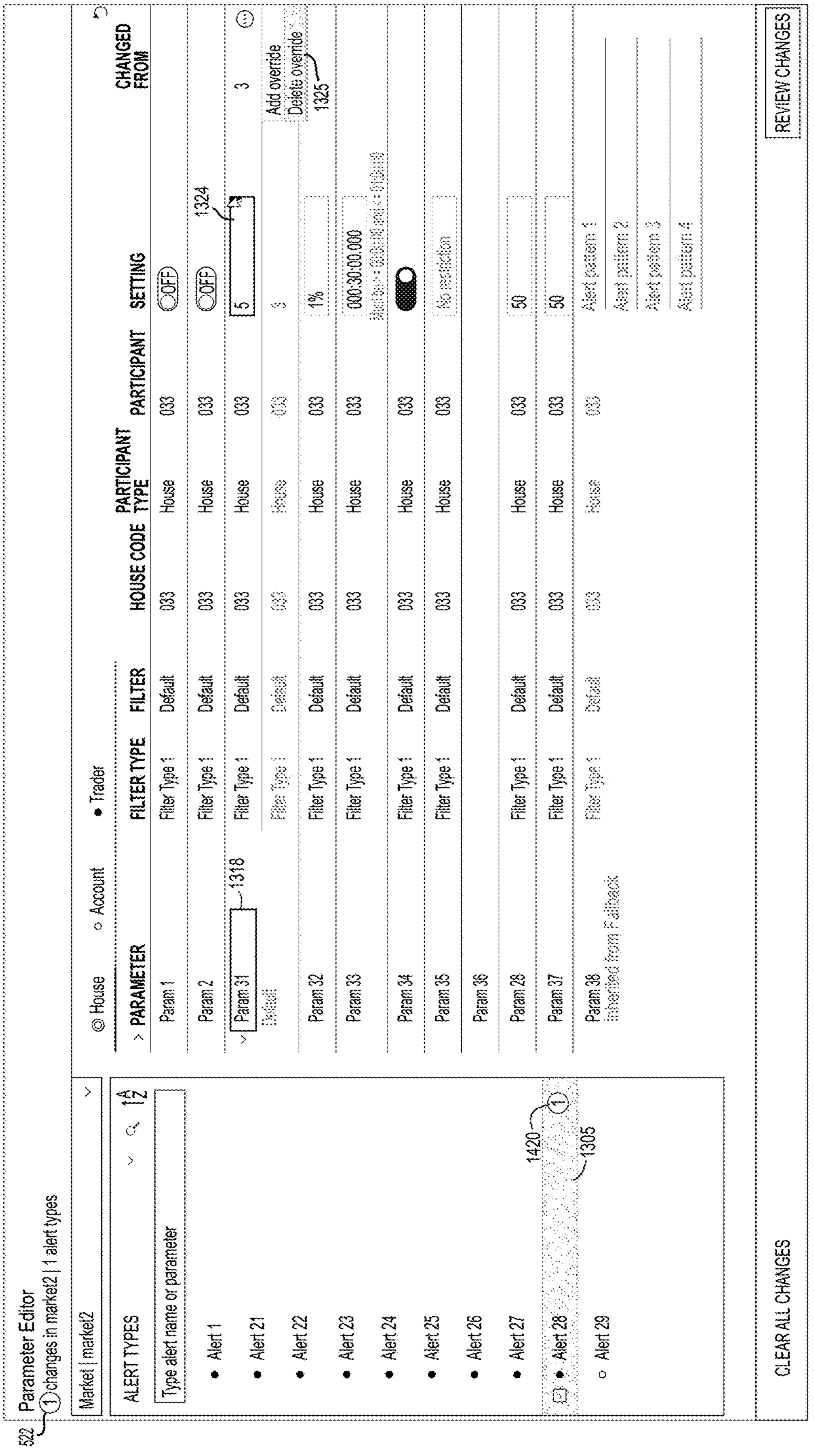

FIG. 15 shows a screen 1500 in which the "delete override" is selectable from a pulldown menu 1325. The selection of the "delete override" action at screen 1500 results in the newly entered setting 1324 for the selected parameter 1318 to be deleted.

Figure 16:
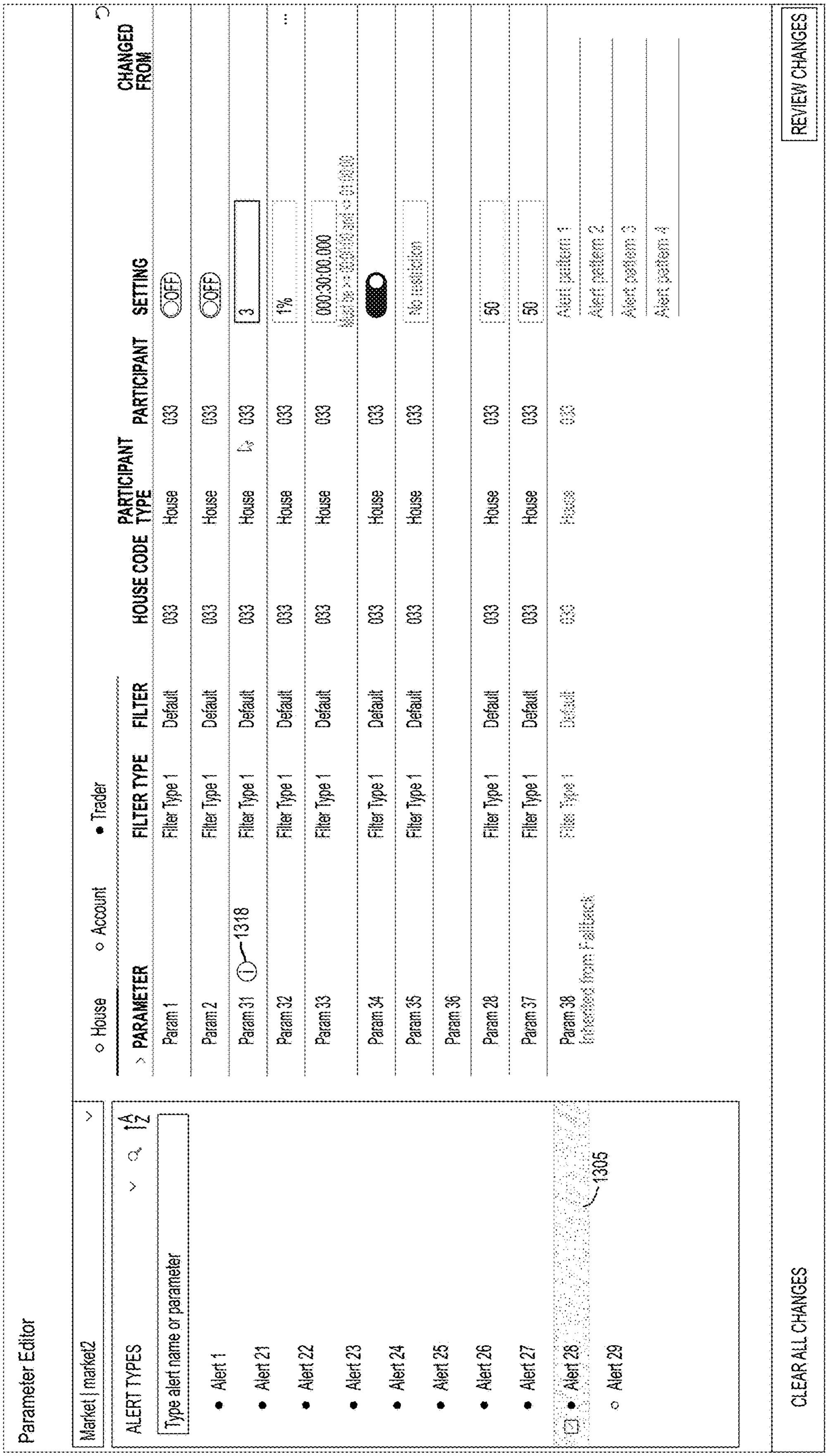

FIG. 16 shows the alert configuration user interface screen 1600 after the deletion of the configured setting for override for parameter "Param31" 1318 that resulted from the "delete override" operation selected on screen 1500. As can be seen, although the counters 1420 and 522 are seen in screen 1500, they are not shown in screen 1600 because no more overrides are pending after 1324 is deleted. It is also seen in screen 1500 that parameter "Param31" 1318 has reverted to the setting of 3.

In some embodiments, instead of selecting "delete override" as shown in FIG. 15, the operator may simply change the value of the settings/value field to the original value and the surveillance alert configuration and management system may display screen 1600. The system may, in response to the operator's input in the settings field, automatically detect that the new configuration row is now identical to the system default configuration row for the parameter and may automatically delete the new configuration row and indicate the system default configuration row as the active configuration for the parameter. After the automatic removal, parameter 1318 has only a single row of configuration. It should be noted that the counters 1420 and 522 are not displayed since they are both 0.

Figure 17:
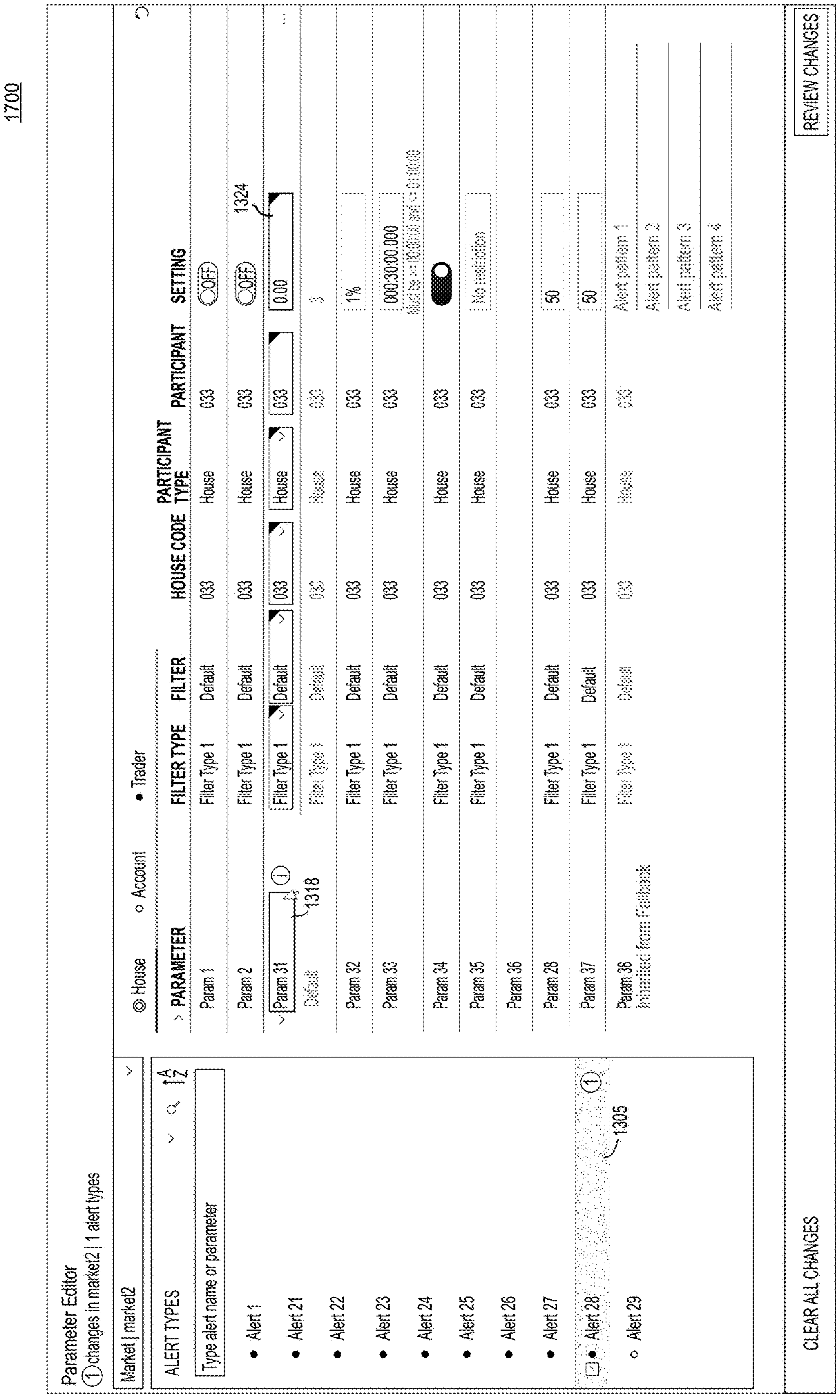

FIG. 17 shows the screen 1700 that may be displayed when, by using a menu such as pulldown menu 1325, the operator elects to "add override" having selected a parameter 1318. A new row is added at the current highest activation level—indicated as "house". This is based on the current activation level selected in activation level selector 407, and is indicated in the new row by "house" in the "participant type" column.

The activation levels, as indicated in the activation level selector 407 (see FIG. 4), enables the operator to selectively enable only certain alerts for each of several predetermined activation levels, rather than the entire set of alerts that are available to be configured for the market). For example, whereas the system may provide (or be initialized with) a default set of configurable alerts and a configurable set of parameters for each alert for each market, the activation level selector 407 and the associated functionality allows the operator to enable a respective subset of the available alerts for each of a plurality of activation levels.

Figure 18:
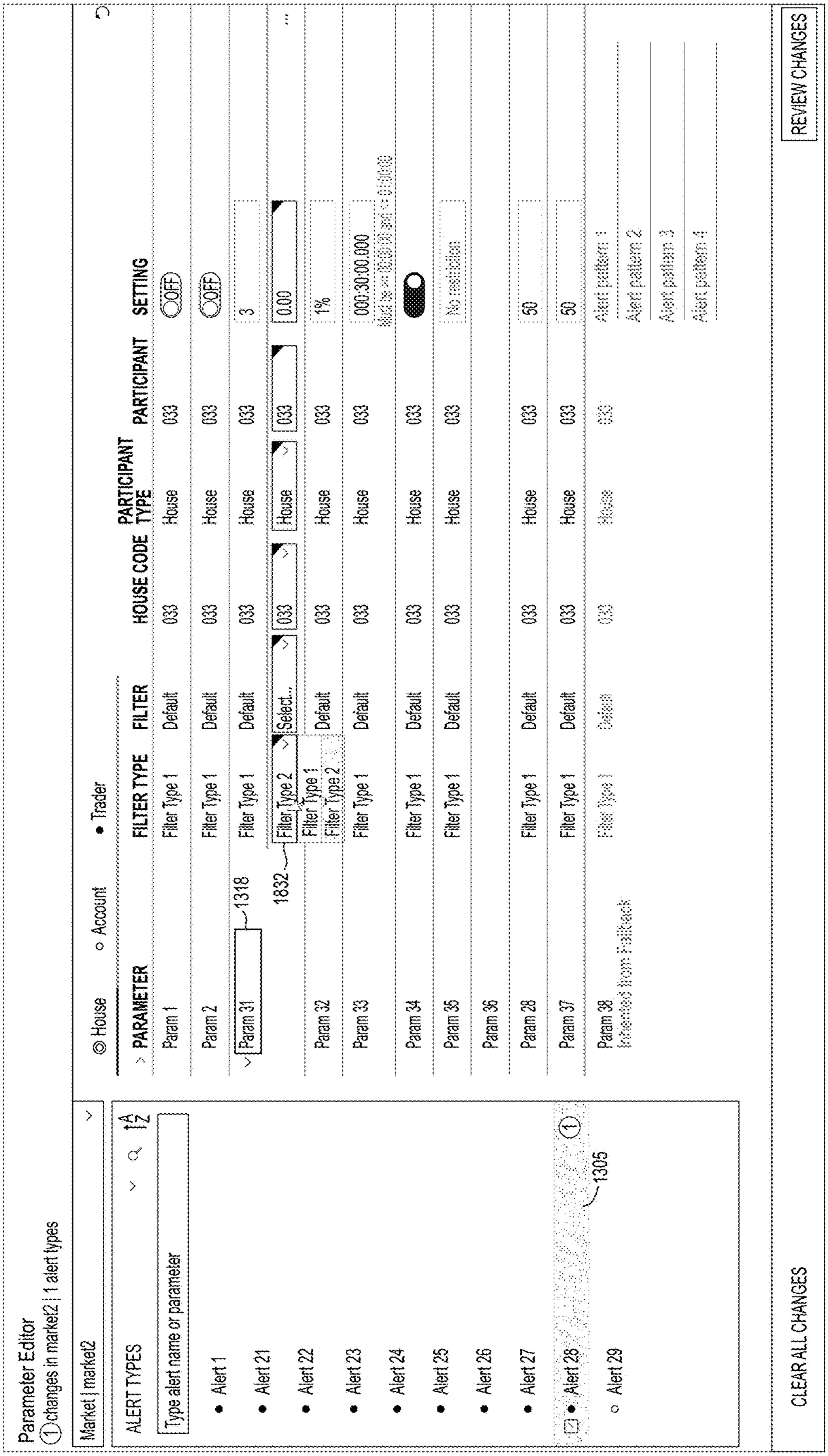

FIG. 18 shows the screen 1800 that may be displayed when the newly added override is being configured. For example, in screen 1800, the filter type is being configured, and the operator may select one of the categories or activation levels from a pulldown menu of choices 1832 for filter type. The "add override" option may enable the operator to customize each of several fields in the configuration row.

Figure 19:
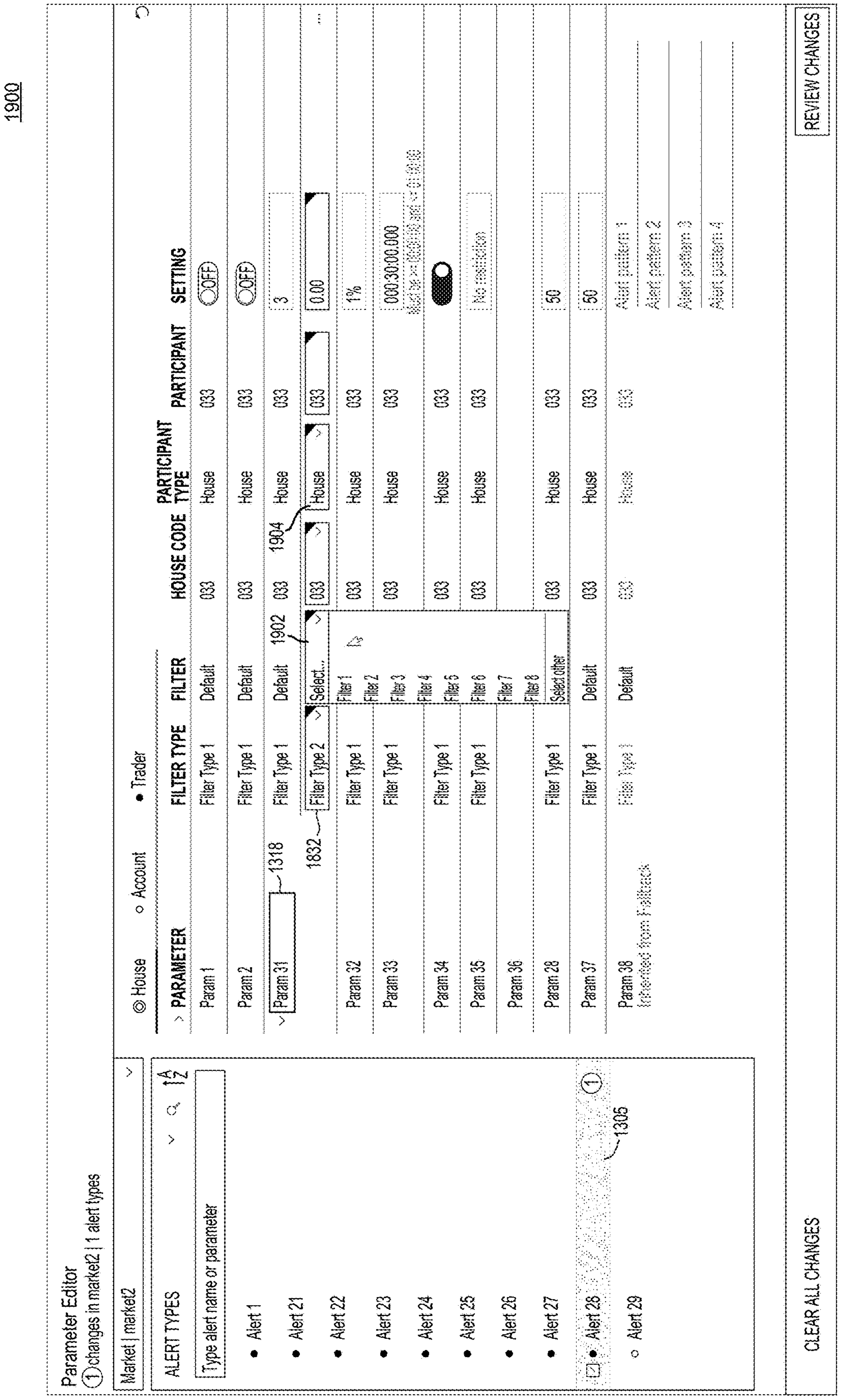

FIG. 19 shows the screen 1900 that may be displayed when the filter 1902 is to be chosen based on the configured filter type 1832. A pulldown menu of choices, based on the current value of the filter type field, may be displayed. It should be noted that the configuration in this new row is for the activation level of "house" as indicated by the participant type field 1904.

Figure 20:
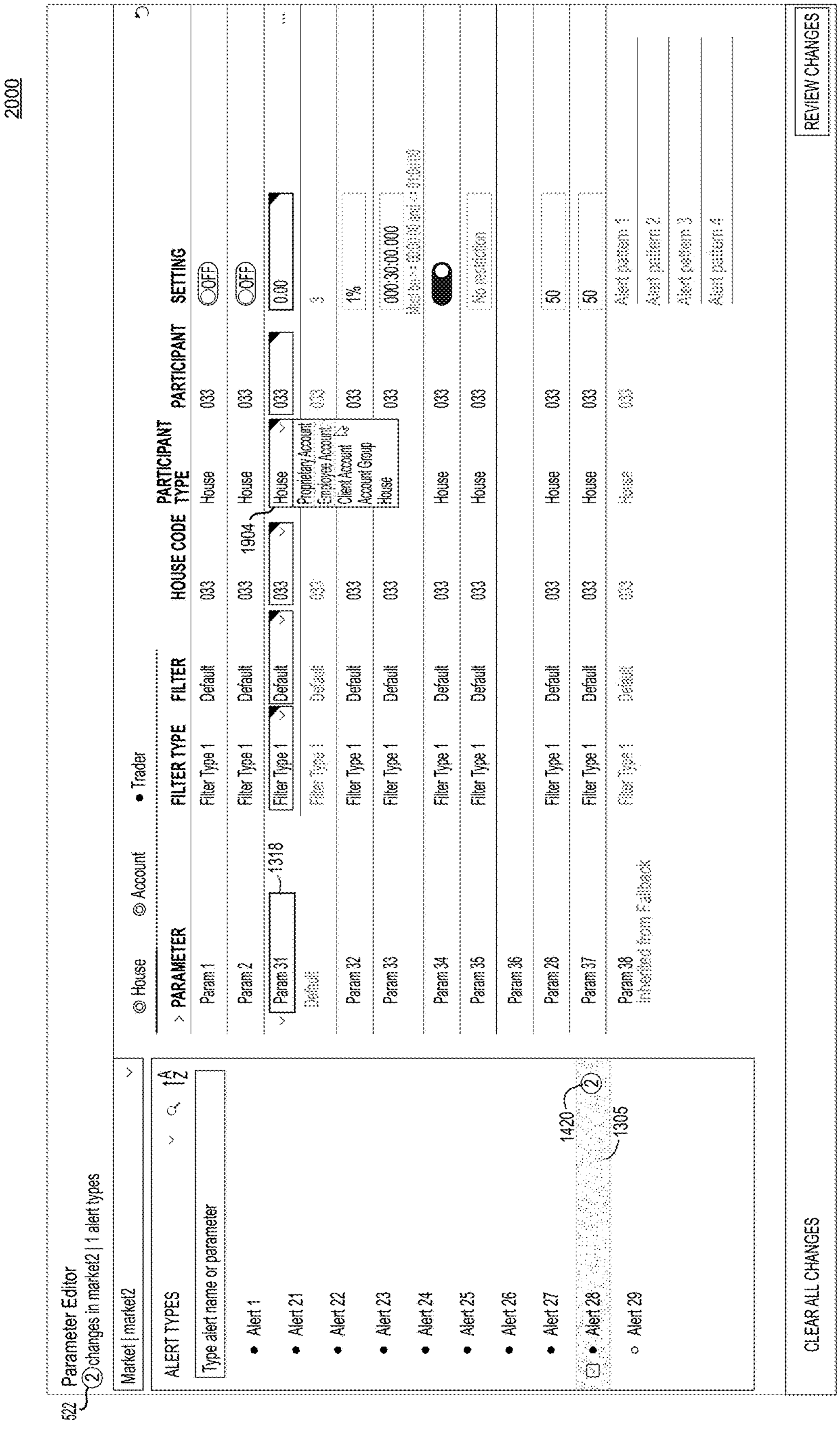

FIG. 20 shows a screen 2000 when the participant type 1904 is configured/changed by the operator. The change of participant type 1902 cause the parameter changes for alert counter 1420 and the total changes counter 522 to both increment, while the changed alert types counter stays the same since both changes are to the same parameter 1318.

Figure 21:
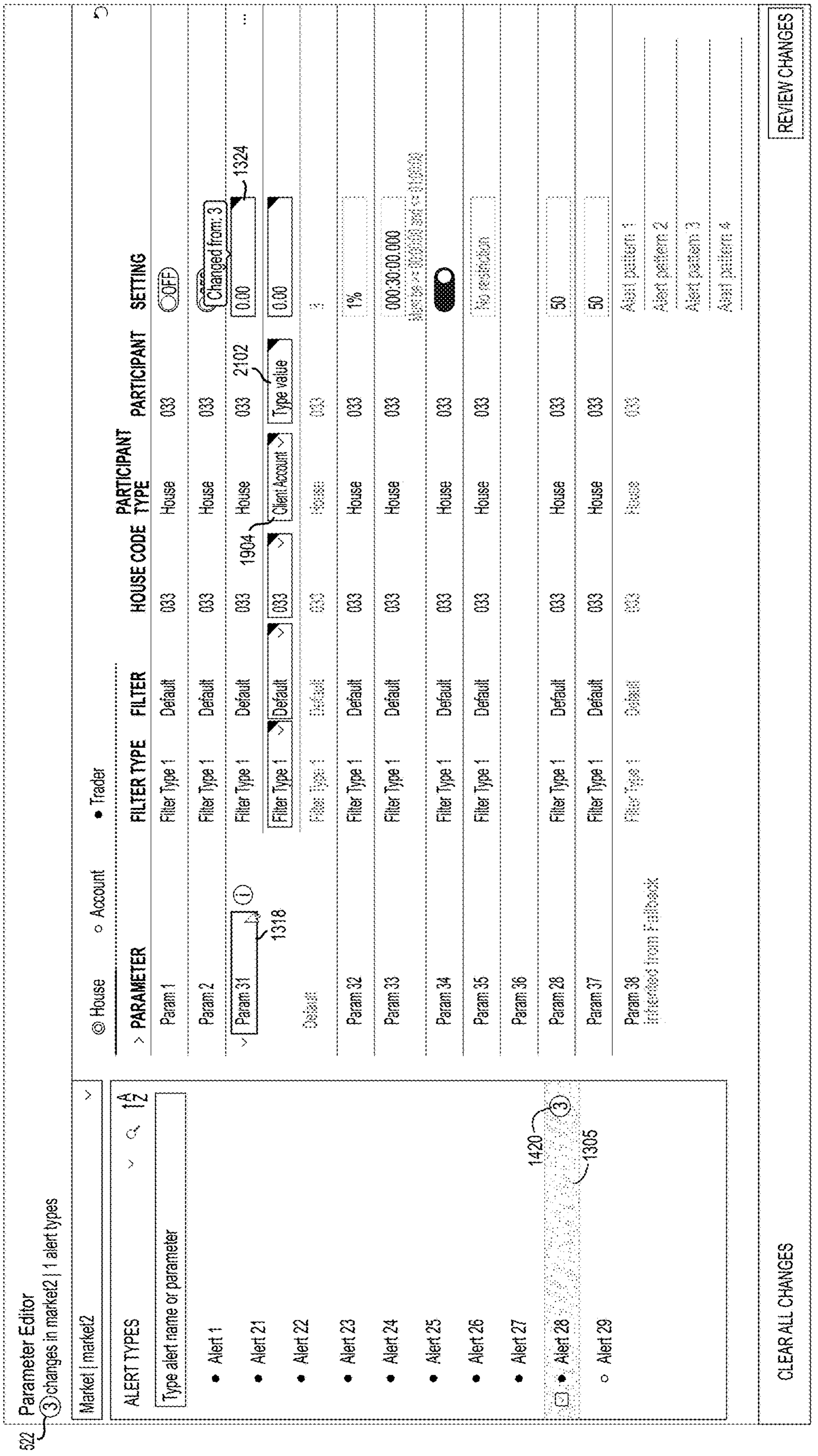
Figure 22:
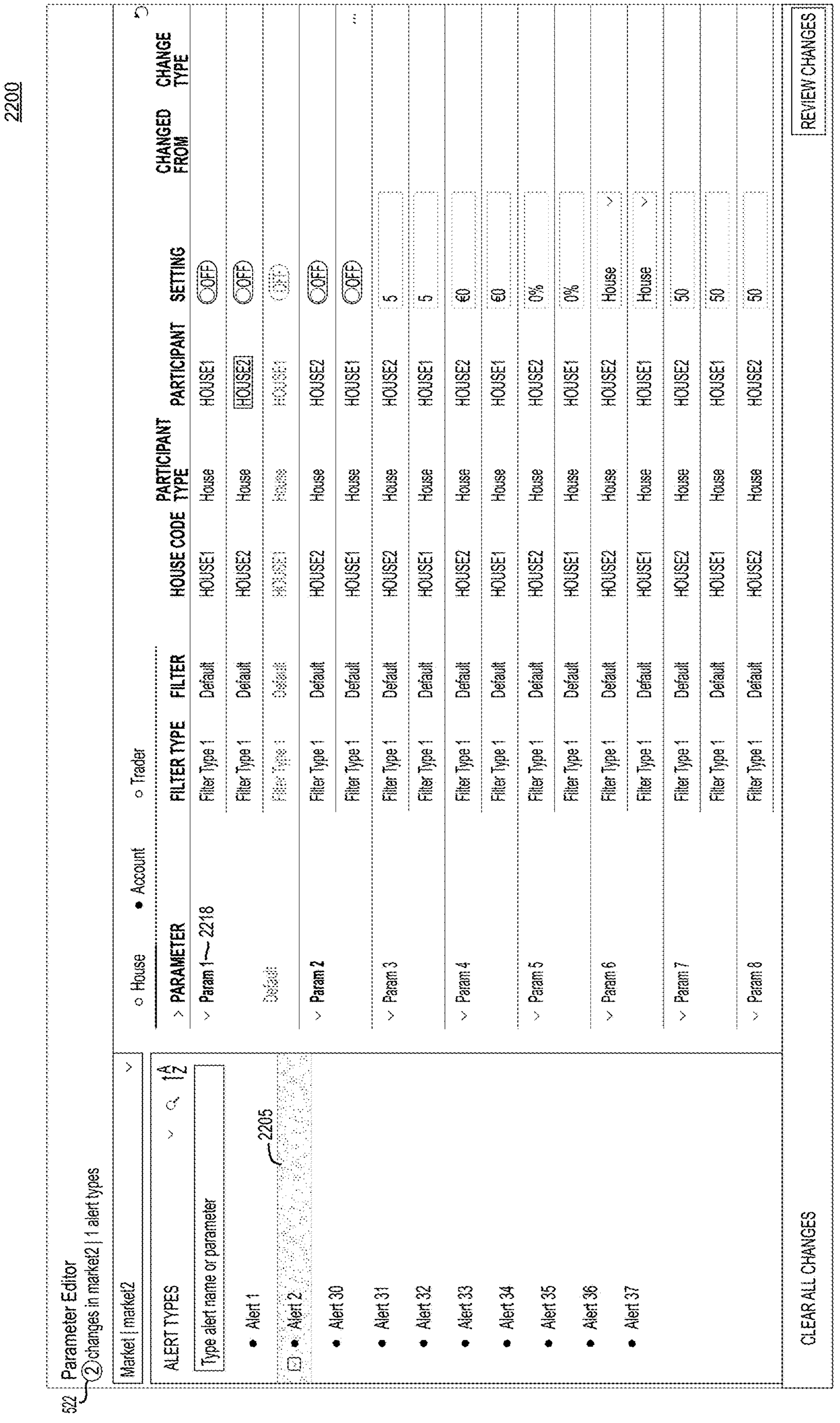
FIG. 22 shows an example screen in which the same parameter is configured separately for two entities, at a particular activation level, in the same market, according to some embodiments.

FIG. 21 shows a screen 2100 when, from screen 2000, another override is added to configure a participant 2102 in addition to the participant type 1904 for the selected parameter 1318. The change of participant type 1904 and participant 2102 cause the parameter changes for alert counter 1420 and the total changes counter 522 to both increment (e.g., from 2 to 3), while the changed alert types counter stays the same since all three changes are to the same parameter 1318.

Description of FIG. 22

FIG. 22 shows a screen 2200 in which the same parameter is configured for two entities, at the activation level of "house", in the same market. For example, for the selected alert "Alert2" 2205, the parameter "Param1" 2218 is configured for entities/participants "house1" and "house2". For the entity house1, one of the configuration rows (the "default") is grayed out, indicating that it is superseded by the other configuration for house1. The entity house2 has only one configuration row.

Since in the shown screen 2200, none of the configuration settings are set to "on", they are not counted as pending changes. If the operator changes the setting field value in either or both the first two rows of configurations for parameter 1318, the parameter changes for alert counter will be shown next to selected alert 2205 with the number of parameter changes that are pending.

Description of FIGS. 23-25

FIGS. 23-25 show examples of a "pattern alert" configuration functionality according to some embodiments of the present disclosure. Screen 2300 in FIG. 23 shows a set of pattern alerts 2302 available for the selected market 2302. The "Param39" parameter 2318 of the selected alert 2305 is identified as a "fallback" 2319, indicating that changes to the setting value of the parameter 2318 would impact the settings of one or more other parameters of the selected alert and/or other alerts. The parameters affected may be referred to as dependents of the selected parameter. The parent dependent relationship between nodes can be stored in the configuration rows of the respective configuration parameters.

Another screen by which changes to the fallback parameter can be made may be provided. Such a screen may show the current configuration settings for a selected configuration row (i.e. in the illustrated example, the non-default setting for participant house2) of the identified parameter. As an example, one may consider the setting of the first configuration row being deleted and the change being applied by selecting an "apply" button on screen 2400. A repeat pattern change counter may show the number of changes triggered by the changes configured on the screen.

FIG. 24 shows a screen 2400 that may result when one of the configuration rows shown in screen 2400 is deleted. Although not shown in FIG. 23, the configurations for parameter 2318 includes respective configuration rows for a default house1 participant setting, a default for a house2 participant setting, a changed setting for house 1 participant and a changed setting for a house2 participant. In screen 2400, Thus, when the setting of the parameter 2318 is changed, in this instance by deleting one of the two settings configurations shown in screen 2400, in addition to the change caused to the selected alert "pattern alerts" 2305 as indicated by the number of parameters changed in alert counter 2402 of alert 2305, several other alerts are shown as being impacted by displaying a respective parameter changes for alert counter for each impacted alert. For example, on screen 2400, the counter associated with the "Alert38" alert is shown to have 6 changes, the "Alert46" alert is shown to have 4 changes, etc. The total changes with the changes triggered by the change in screen 2400 to the "Param39" parameter is shown the counter 522.

FIG. 25 shows another example screen 2500 illustrating multiple parameters of the same alert can be impacted by a single change to a fallback parameter, such as, for example, the fallback parameter identified in screen 2300. In the illustrated example, "Param46" parameter 2518 and "Param47" parameter, both of the "Alert39" alert 2505 and identified by an "inherited from fallback" identifier 2519, are impacted by the change made to the fallback parameter.

In the case of pattern alerts, the computer system may automatically ensure that the affected parameter configurations are not modifiable at dependents, and can only be modified at the parent.

Description of FIGS. 26-28

FIGS. 26-28 relate to reviewing pending alert parameter configuration changes and testing such changes. The reviewing and testing as shown in FIGS. 26-28 enable the computer system (e.g., computer system 100) to reduce erroneous alert configurations that may contradict, or otherwise negatively impact already configured alerts (e.g., reduce the effectiveness of the already configured alerts' capability to detect certain abnormal behavior).

FIG. 26 shows screen 2600 in which 3 pending configuration changes are listed. This screen enables the operator to view only the changes without the distraction of having parameters and alerts that do not have pending changes being displayed. The pending changes may be summarized, such as, for example, at the top left and in a right column on screen 2600. The capability for the operator to view all pending configuration changes on a single screen such as screen 2600, along with the number of changes, the markets affected, and the different alert types that are affected, enables the operator to quickly verify the system's alert configurations before new configurations are deployed.

Optionally, the operator may further verify the new configurations by subjecting the new configurations to calibration test runs with existing transaction data. FIG. 27 shows a screen 2700 that enables specifying date ranges for calibration/test runs of the parameter configurations with the pending changes being incorporated. As shown, separate tests may be specified for each affected market.

FIG. 28 shows a screen 2800 that enables the running of respectively configured calibrations/tests. The tests available to run may be shown in a listing 2802, in which each test is represented by a separate row 2804. Another listing 2806, arranged on the same screen 2800, shows the parameter changes that are included in a selected one of the calibration runs.

In some embodiments, the system provides the operator with the capability to create a new calibration run by duplicating an already configured calibration run. After the new calibration run is created by duplication, its set of alerts, parameters for the respective alerts, activation levels, etc., can be customized in accordance with the requirements for the new calibration run. This capability enables the operator to quickly generate calibration runs to test various hypotheses before a new alert configuration is activated.

Description of FIG. 29

FIG. 29 shows a validation screen 2900 that enables the operator to quickly visualize and identify the cause of errors in specified configurations, according to some embodiments. One type of validation is a duplication check. The duplication check may trigger a validation error when all configuration fields, or a subset of all configuration fields, of a first configuration row for a particular alert parameter are identical to the corresponding configuration fields of a second configuration row for that alert parameter. In one embodiment, a validation error is indicated when the first and second configuration rows are identical in all configuration fields except for the settings field.

Another type of validation checks for empty or invalid values in user-configured fields.

In order to improve the efficiency of detecting and determining validation errors when configuring parameters, the system clearly identifies and/or highlights the configuration fields and configuration rows that trigger the validation error. For example, in screen 2900, each configuration field in the second configuration row for the "Param5" parameter 2919 of "Alert2" alert 2920 is visually identified and/or highlighted to clearly illustrate the validation error caused by the first and second configuration rows matching on all configuration fields other than the settings field. The first and second rows are each also identified as being affected by the validation error(s). The configuration fields, in screen 2900, are visually identified and/or highlighted using a color outline (shown as a thicker outline) of each configuration field by a bar to the left of each configuration row.

A bar to the left of the parameter name identifies that the parameter includes validation errors. That is, when at least one configuration row of an alert parameter is identified as being associated with one or more validation errors, then the alert parameter is also identified as being associated with the validation error(s).

Alerts associated with one or more validation errors, such as, for example, alerts of which one or more parameters are associated with a validation error, may also be visually identified as being associated with one or more validation errors. In screen 2900, the parameter changes for alert counter 2920 associated with the "Alert2" alert is also identified as being associated with one or more validation errors by a color/thick outline.

The market indicator of the currently displayed market may also be configured to visually represent that the currently displayed market is associated with one or more validation errors. For example, in some embodiments, the market indicator may be displayed in a different color and/or font when the currently displayed market is associated with one or more validation errors.

Still further, in some embodiments, the entity level indicator may also be adapted to represent being affected by one or more validation errors.

The "Param4" parameter 2918, in contrast to the "Param5" parameter 2919, is not indicated to be causing a validation error.

Description of FIG. 30

FIG. 30 is a block diagram of an example computing device 3000 (which may also be referred to, for example, as a "computing device," "computer system," or "computing system") according to some embodiments. In some embodiments, the computing device 3000 includes one or more of the following: one or more processors 3002 (which may be referred to as "hardware processors" or individually as a "hardware processor"); one or more memory devices 3004; one or more network interface devices 3006; one or more display interfaces 3008; and one or more user input adapters 3010. Additionally, in some embodiments, the computing device 3000 is connected to or includes a display device 3012. As will explained below, these elements (e.g., the processors 3002, memory devices 3004, network interface devices 3006, display interfaces 3008, user input adapters 3010, display device 3012) are hardware devices (for example, electronic circuits or combinations of circuits) that are configured to perform various different functions for the computing device 3000. In some embodiments, these components of the computing device 3000 may be collectively referred to as computing resources (e.g., resources that are used to carry out execution of instructions and include the processors (one or more processors 3002), storage (one or more memory devices 3004), and I/O (network interface devices 3006, one or more display interfaces 3008, and one or more user input adapters 3010). In some instances, the term processing resources may be used interchangeably with the term computing resources. In some embodiments, multiple instances of computing device 3000 may arranged into a distributed computing system.

In some embodiments, each or any of the processors 3002 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 3002 uses an instruction set architecture such as x86 or Advanced RISC Machine (ARM).

In some embodiments, each or any of the memory devices 3004 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 3002). Memory devices 3004 are examples of non-transitory computer-readable storage media.

In some embodiments, each or any of the network interface devices 3006 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), LTE Pro, Fifth Generation New Radio (5G NR) and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, data is communicated over an electronic data network. An electronic data network includes implementations where data is communicated from one computer process space to computer process space and thus may include, for example, inter-process communication, pipes, sockets, and communication that occurs via direct cable, cross-connect cables, fiber channel, wired and wireless networks, and the like. In certain examples, network interface devices 3006 may include ports or other connections that enable such connections to be made and communicate data electronically among the various components of a distributed computing system.

In some embodiments, each or any of the display interfaces 3008 is or includes one or more circuits that receive data from the processors 3002, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 3012, which displays the image data. Alternatively or additionally, in some embodiments, each or any of the display interfaces 3008 is or includes, for example, a video card, video adapter, or graphics processing unit (GPU).

In some embodiments, each or any of the user input adapters 3010 is or includes one or more circuits that receive and process user input data from one or more user input devices (not shown in FIG. 30) that are included in, attached to, or otherwise in communication with the computing device 3000, and that output data based on the received input data to the processors 3002. Alternatively or additionally, in some embodiments each or any of the user input adapters 3010 is or includes, for example, a PS/2 interface, a USB interface, a touchscreen controller, or the like; and/or the user input adapters 3010 facilitates input from user input devices (not shown in FIG. 30) such as, for example, a keyboard, mouse, trackpad, touchscreen, etc.

In some embodiments, the display device 3012 may be a Liquid Crystal Display (LCD) display, Light Emitting Diode (LED) display, or other type of display device. In embodiments where the display device 3012 is a component of the computing device 3000 (e.g., the computing device and the display device are included in a unified housing), the display device 3012 may be a touchscreen display or non-touchscreen display. In embodiments where the display device 3012 is connected to the computing device 3000 (e.g., is external to the computing device 3000 and communicates with the computing device 3000 via a wire and/or via wireless communication technology), the display device 3012 is, for example, an external monitor, projector, television, display screen, etc.

In various embodiments, the computing device 3000 includes one, or two, or three, four, or more of each or any of the above-mentioned elements (e.g., the processors 3002, memory devices 3004, network interface devices 3006, display interfaces 3008, and user input adapters 3010). Alternatively or additionally, in some embodiments, the computing device 3000 includes one or more of: a processing system that includes the processors 3002; a memory or storage system that includes the memory devices 3004; and a network interface system that includes the network interface devices 3006. Alternatively, or additionally, in some embodiments, the computing device 3000 includes a system-on-a-chip (SoC) or multiple SoCs, and each or any of the above-mentioned elements (or various combinations or subsets thereof) is included in the single SoC or distributed across the multiple SoCs in various combinations. For example, the single SoC (or the multiple SoCs) may include the processors 3002 and the network interface devices 3006; or the single SoC (or the multiple SoCs) may include the processors 3002, the network interface devices 3006, and the memory devices 3004; and so on. The computing device 3000 may be arranged in some embodiments such that: the processors 3002 include a multi or single-core processor; the network interface devices 3006 include a first network interface device (which implements, for example, WiFi, Bluetooth, NFC, etc.) and a second network interface device that implements one or more cellular communication technologies (e.g., 3G, 4G LTE, CDMA, etc.); the memory devices 3004 include RAM, flash memory, or a hard disk. As another example, the computing device 3000 may be arranged such that: the processors 3002 include two, three, four, five, or more multi-core processors; the network interface devices 3006 include a first network interface device that implements Ethernet and a second network interface device that implements WiFi and/or Bluetooth; and the memory devices 3004 include a RAM and a flash memory or hard disk.

As previously noted, whenever it is described in this document that a software module or software process performs any action, the action is in actuality performed by underlying hardware elements according to the instructions that comprise the software module. Consistent with the foregoing, in various embodiments, each or any combination of the surveillance alert configuration and management computer system 100, server device 102, and client device 104, each of which will be referred to individually for clarity as a "component" for the remainder of this paragraph, are implemented using an example of the computing device 3000 of FIG. 30. In such embodiments, the following applies for each component: (a) the elements of the 3000 computing device 3000 shown in FIG. 30 (i.e., the one or more processors 3002, one or more memory devices 3004, one or more network interface devices 3006, one or more display interfaces 3008, and one or more user input adapters 3010), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 3004 (e.g., in various embodiments, in a volatile memory device such as a RAM or an instruction register and/or in a non-volatile memory device such as a flash memory or hard disk) and all actions described herein as performed by the software modules are performed by the processors 3002 in conjunction with, as appropriate, the other elements in and/or connected to the computing device 3000 (i.e., the network interface devices 3006, display interfaces 3008, user input adapters 3010, and/or display device 3012); (c) alternatively or additionally, to the extent it is described herein that the component processes and/or otherwise handles data, in some embodiments, such data is stored in the memory devices 3004 (e.g., in some embodiments, in a volatile memory device such as a RAM and/or in a non-volatile memory device such as a flash memory or hard disk) and/or is processed/handled by the processors 3002 in conjunction, as appropriate, the other elements in and/or connected to the computing device 3000 (i.e., the network interface devices 3006, display interfaces 3008, user input adapters 3010, and/or display device 3012); (d) alternatively or additionally, in some embodiments, the memory devices 3002 store instructions that, when executed by the processors 3002, cause the processors 3002 to perform, in conjunction with, as appropriate, the other elements in and/or connected to the computing device 3000 (i.e., the memory devices 3004, network interface devices 3006, display interfaces 3008, user input adapters 3010, and/or display device 3012), each or any combination of actions described herein as performed by the component and/or by any software modules described herein as included within the component. Consistent with the preceding paragraph, as one example, in an embodiment where an instance of the computing device 3000 is used to implement the client device 104, the memory devices 3004 could load the files associated with the surveillance alert user interface (e.g., HTML, XML, JavaScript files), and/or store the data described herein as processed and/or otherwise handled by the applications 112, 114, 116, 118 and 120 and/or the client device 104. Processors 3002 could be used to operate a rendering module, networking module, and JavaScript module, and/or otherwise process the data described herein as processed by the web browser application 116 and/or the client device 104.

The hardware configurations shown in FIG. 30 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 30, (e) via other hardware arrangements, architectures, and configurations, and/or via combinations of the technology described in (a) through (e).

Technical Advantages of Described Subject Matter

In certain example embodiments, a surveillance alert configuration and management user interface is provided that, in contrast to conventional user interfaces that may not provide adequate clarity or information with respect to the impact of various pending configuration changes to alerts that are used to timely detect abnormal user activity and/or abnormal system events in high transaction volume high reliability computer processing systems such as, for example, electronic trading systems, enables improved response times and improved reliability of operator responses to such events.

Embodiments provide for the operator to, on a single display screen, visualize the impact of any pending configuration change to a parameter of an alert. The impact is clearly represented by highlighting, or otherwise distinguishably identifying, any or all configuration parameters, activation levels, surveillance alerts, electronic trading systems, etc. that are impacted by the pending configuration change. Moreover, by dynamically updating and displaying the number of parameters changed per alert, the total number of parameter changes across electronic trading system, and the number of alerts that have configuration parameter changes as pending configuration changes are being input by the operator, the operator is provided with the capability to rapidly assess the effect of pending configuration changes before those changes are deployed to data from live electronic trading systems. Thus, embodiments enable the operator to respond to abnormal events and actions detected in real-time in a timely manner so as to improve the reliability and responsiveness of the electronic trading systems and/or monitoring systems of the electronic trading systems to such events and actions.

Embodiments may also improve the speed and responsiveness of the computer system that displays the surveillance alert configuration and management user interface. A configuration data structure is configured to store initial configurations and changed configurations of alerts and alerts' configuration parameters in hierarchical structures that enable fast counting of pending configuration changes so that the user interface can be updated with minimum delay to represent the impact of pending configuration changes across the system. Fast rendering of updates to the user interface is enabled by configuring the changes in the configuration data structure such that the changes can be counted efficiently with minimum time delays to obtain the counts for multiple counters that track the number of changes.

In modern systems, operators are often in situations where they are even temporarily limited to small screen sizes (e.g., tablets, smartphone, etc.). Some embodiments, by clearly representing, by using a collection of counters, the impact that any one alert configuration parameter change can have on the alert configurations throughout the system on a single screen, present a clear, more easily comprehensible view of system alerts to the operator in a manner that is adaptive even to smaller screen sizes.

Thus, the technical features described herein may improve the operator's capabilities to respond quickly and effectively to issues in a monitored system and may also improve the reliability and performance of the alert configuration system and monitored computer systems.

Selected Terminology

The elements described in this document include actions, features, components, items, attributes, and other terms. Whenever it is described in this document that a given element is present in "some embodiments," "various embodiments," "certain embodiments," "certain example embodiments, "some example embodiments," "an exemplary embodiment," "an example," "an instance," "an example instance," or whenever any other similar language is used, it should be understood that the given element is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments.

Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an", and "the" should be read as meaning "at least one," "one or more," or the like; the term "example", which may be used interchangeably with the term embodiment, is used to provide examples of the subject matter under discussion, not an exhaustive or limiting list thereof; the terms "comprise" and "include" (and other conjugations and other variations thereof) specify the presence of the associated listed elements but do not preclude the presence or addition of one or more other elements; and if an element is described as "optional," such description should not be understood to indicate that other elements, not so described, are required.

As used herein, the term "non-transitory computer-readable storage medium" includes a register, a cache memory, a ROM, a semiconductor memory device (such as D-RAM, S-RAM, or other RAM), a magnetic medium such as a flash memory, a hard disk, a magneto-optical medium, an optical medium such as a CD-ROM, a DVD, or Blu-Ray Disc, or other types of volatile or non-volatile storage devices for non-transitory electronic data storage. The term "non-transitory computer-readable storage medium" does not include a transitory, propagating electromagnetic signal.

The claims are not intended to invoke means-plus-function construction/interpretation unless they expressly use the phrase "means for" or "step for." Claim elements intended to be construed/interpreted as means-plus-function language, if any, will expressly manifest that intention by reciting the phrase "means for" or "step for"; the foregoing applies to claim elements in all types of claims (method claims, apparatus claims, or claims of other types) and, for the avoidance of doubt, also applies to claim elements that are nested within method claims. Consistent with the preceding sentence, no claim element (in any claim of any type) should be construed/interpreted using means plus function construction/interpretation unless the claim element is expressly recited using the phrase "means for" or "step for."

Whenever it is stated herein that a hardware element (e.g., a processor, a network interface, a display interface, a user input adapter, a memory device, or other hardware element), or combination of hardware elements, is "configured to" perform some action, it should be understood that such language specifies a physical state of configuration of the hardware element(s) and not mere intended use or capability of the hardware element(s). The physical state of configuration of the hardware elements(s) fundamentally ties the action(s) recited following the "configured to" phrase to the physical characteristics of the hardware element(s) recited before the "configured to" phrase. In some embodiments, the physical state of configuration of the hardware elements may be realized as an application specific integrated circuit (ASIC) that includes one or more electronic circuits arranged to perform the action, or a field programmable gate array (FPGA) that includes programmable electronic logic circuits that are arranged in series or parallel to perform the action in accordance with one or more instructions (e.g., via a configuration file for the FPGA). In some embodiments, the physical state of configuration of the hardware element may be specified through storing (e.g., in a memory device) program code (e.g., instructions in the form of firmware, software, etc.) that, when executed by a hardware processor, causes the hardware elements (e.g., by configuration of registers, memory, etc.) to perform the actions in accordance with the program code.

A hardware element (or elements) can therefore be understood to be configured to perform an action even when the specified hardware element(s) is/are not currently performing the action or is not operational (e.g., is not on, powered, being used, or the like). Consistent with the preceding, the phrase "configured to" in claims should not be construed/interpreted, in any claim type (method claims, apparatus claims, or claims of other types), as being a means plus function; this includes claim elements (such as hardware elements) that are nested in method claims.

Additional Applications of Described Subject Matter

Although examples are provided herein with respect to the trading of equities (i.e., equity securities/stock), the technology described herein may also be used, mutatis mutandis, with any type of asset, including but not limited to other types of financial instruments (e.g., bonds, options, futures), currencies, cryptocurrencies, and/or non-financial assets. Further, although examples are provided herein with respect to electronic trading platforms, the technology described herein may also be used, mutatis mutandis, with other types of distributed computing systems, including but not limited to telecommunication networks, payment processing systems, industrial control systems, parallel scientific computation systems, smart contract systems, transaction processing systems, distributed databases, and/or other types of distributed systems.

Although process steps, algorithms or the like, including without limitation with reference to FIGS. 3 and 7, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A system comprising:

a display device;

a memory storing a configuration data structure comprising configuration parameters of a plurality of surveillance alerts for one or more electronic trading systems, wherein the configuration parameters for each of the plurality of surveillance alerts comprises a respective set of configuration parameters, and each configuration parameter in each set of configuration parameters comprises one or more configuration fields each comprising a respective initial value; and at least one processor configured to:

display a graphical user interface comprising the set of configuration parameters of a selected surveillance alert of the plurality of surveillance alerts on the display device, wherein, for each configuration parameter of the set of configuration parameters, the one or more configuration fields are displayed on the graphical user interface;

receive an operator input via the displayed graphical user interface, the operator input providing a new value for a first configuration field of a first configuration parameter of the selected surveillance alert, wherein the new value is different from the respective initial value of the first configuration field;

in response to receiving the new value for the first configuration field and before the new value for the first configuration field is applied to an active alert configuration of the one or more electronic trading systems:

(a) update the configuration data structure in the memory to temporarily store the new value as an uncommitted configuration override in association with the first configuration field, wherein the updated configuration data structure associates an initial value and the new value with the first configuration field and directly or indirectly associates the first configuration field with the selected surveillance alert;

(b) adjust a first counter, wherein the first counter is configured to track a number of uncommitted configuration overrides associated with the selected surveillance alert, wherein the adjusting the first counter includes incrementing the first counter in response to the receiving the new value for the first configuration field;

(c) display the adjusted first counter in association with a name of the selected surveillance alert;

(d) adjust a second counter and display a name of at least one of the one or more electronic trading systems in association with the second counter, concurrently with said displaying the adjusted first counter, wherein the second counter is configured to track a total number of uncommitted configuration overrides associated with the one or more electronic trading systems; and (e) adjust a third counter and display the third counter, wherein the third counter is configured to track a number of respective surveillance alerts of the one or more electronic trading systems that have at least one uncommitted configuration override; and in response to receiving a further operator input via the displayed graphical user interface, apply the new value for the first configuration field to an active alert configuration of at least one of the one or more electronic trading systems.

2. The system according to claim 1, wherein, in response to receiving the new value for the first configuration field, insert a new configuration row in the configuration data structure, and wherein the adjusting the first counter is based on a counting of inserted new configuration rows in the configuration data structure.

3. The system according to claim 2, wherein the configuration data structure is configured to arrange the initial values of the set of parameters and changed values thereof in respective different storage hierarchies, and wherein the counting of inserted new configuration rows in the configuration data structure comprises counting the inserted new configuration rows in the respective storage hierarchy of the changed values.

4. The system according to claim 3, wherein the configuration data structure comprises a respectively different hierarchical data structure for each electronic trading system of the one or more electronic trading systems, wherein the adjusting the second counter comprises counting said inserted new configuration rows in the respectively different hierarchical data structure of the one or more electronic trading systems.

5. The system according to claim 1, wherein the configuration data structure comprises a respectively different hierarchical data structure for initial configurations and changed configurations, wherein said each respectively different hierarchical data structure comprises a respectively different first hierarchical data substructure for each electronic trading system of the one or more electronic trading systems, wherein each said respectively different first hierarchical data substructure comprises a respectively different second hierarchical data substructure for each of one or more surveillance alerts of the plurality of surveillance alerts;

wherein the at least one processor is further configured to, in response to changing the configuration of the first configuration parameter of the selected surveillance alert, insert a new configuration row in the respectively different second hierarchical data substructure of the selected surveillance alert, wherein the respectively different second hierarchical data substructure of the selected surveillance alert is arranged in the respectively different first hierarchical data substructure of the electronic trading system in the respectively different hierarchical data structure of the changed configurations; and wherein the adjusting the third counter comprises counting respectively different second hierarchical data substructures in the respectively different hierarchical data structure of the changed configurations.

6. The system according to claim 1, wherein the configuration data structure comprises information of parent-child relationship between pairs of configuration parameters;

wherein the at least one processor is further configured to:

in response to the changing of a parent configuration parameter via the graphical user interface, automatically adjust the respective first counter associated with each of the sets of configuration parameters that inherits from the parent configuration parameter and automatically adjust the second counter and the third counter.

7. The system according to claim 6, wherein at least one of the sets of configuration parameters that inherits from the parent configuration parameter is associated with another surveillance alert.

8. The system according to claim 7, wherein the another surveillance alert is configured for another electronic trading system of the one or more electronic trading systems.

9. The system according to claim 1, wherein the graphical user interface comprises at least three display areas: a first display area displaying a name of the electronic trading system, a second display area displaying a plurality of surveillance alerts of the electronic trading system, and a third area displaying the plurality of configuration parameters of the selected surveillance alert, and wherein the at least one processor is further configured to, in response to the changing, render at least one update in each of the three display areas.

10. The system according to claim 9, wherein the graphical user interface comprises a fourth display area displaying a plurality of activation levels of which one activation level is associated with the displayed plurality of configuration parameters, and wherein the at least one processor is further configured to, in response to the changing, update the fourth display area.

11. The system according to claim 10, wherein a respective enable indicator is displayed in association with an activation level in the fourth display area and with each set of parameters displayed in the second display area, wherein the enable indicator associated with the activation level indicates whether at least one of the displayed sets of parameters is enabled for that activation level and the enable indicator associated with a set of parameters indicates whether that set of parameters is enabled for the electronic trading system.

12. The system according to claim 1, wherein the at least one processor is further configured to:

in response to receiving the new value for the first configuration field, changing an appearance of at least one of a first field and a displayed name of the first configuration parameter, concurrently with said displaying the adjusted first counter.

13. The system according to claim 1, wherein the at least one processor is further configured to:

in response to the changing of the first configuration parameter, change an appearance of a displayed name of an activation level associated with the first configuration parameter, wherein the activation level is one of a plurality of activation levels each of which is associated with one or more configuration parameters.

14. The system according to claim 1, wherein the at least one processor is further configured to:

in response to the changing of the first configuration parameter, display a value of the first configuration parameter after the change, a value of the first configuration parameter before the change, and a type of the change.

15. The system according to claim 1, wherein the at least one processor is further configured to:

in response to changing a configuration of a second configuration parameter of the selected set of parameters, validate the changing of the second configuration parameter and in response to a failing of the validation, changing an appearance of at least one of the fields of the second configuration parameter, a displayed name of the second configuration parameter, and a displayed name of the electronic trading system.

16. The system according to claim 15, wherein the at least one processor is further configured to:

in response to changing a configuration of the second configuration parameter of the selected set of parameters and in response to a failing of the validation, change an appearance of at least one of the fields of another configuration parameter, wherein the validation detects the another configuration parameter as a duplicate of the second configuration parameter.

17. The system according to claim 16, wherein the at least one processor is further configured to:

in response to changing a configuration of a second configuration parameter of the selected set of parameters via the graphical user interface and in response to a failing of the validation, change an appearance of a displayed name of a surveillance alert associated with the second configuration parameter, wherein the surveillance alert is associated with one of a plurality of surveillance alerts each of which is associated with one or more configuration parameters.

18. A method comprising:

storing, in a memory coupled to at least one processor, a configuration data structure comprising configuration parameters of a plurality of surveillance alerts for one or more electronic trading systems, wherein the configuration parameters for each of the plurality of surveillance alerts comprises a respective set of configuration parameters, and each configuration parameter in each set of configuration parameters comprises one or more configuration fields each comprising a respective initial value;

displaying, on a display device coupled to the at least one processor, a graphical user interface comprising the set of configuration parameters of a selected surveillance alert of the plurality of surveillance alerts, wherein, for each configuration parameter of the set of configuration parameters, the one or more configuration fields are displayed on the graphical user interface;

receiving an operator input via the displayed graphical user interface, the operator input providing a new value for a first configuration field of a first configuration parameter of the selected surveillance alert, wherein the new value is different from the respective initial value of the first configuration field; and in response to receiving the new value for the first configuration field and before the new value for the first configuration field is applied to an active alert configuration of the one or more electronic trading systems:

(a) updating the configuration data structure in the memory to temporarily store the new value as an uncommitted configuration override in association with the first configuration field, wherein the updated configuration data structure associates an initial value and the new value with the first configuration field and directly or indirectly associates the first configuration field with the selected surveillance alert;

(b) adjusting a first counter, wherein the first counter is configured to track a number of uncommitted configuration overrides associated with the selected surveillance alert, wherein the adjusting the first counter includes incrementing the first counter in response to the receiving the new value for the first configuration field;

(c) displaying the adjusted first counter in association with a name of the selected surveillance alert;

(d) adjust a second counter and display a name of at least one of the one or more electronic trading systems in association with the second counter, concurrently with said displaying the adjusted first counter, wherein the second counter is configured to track a total number of uncommitted configuration overrides associated with the one or more electronic trading systems; and (e) adjust a third counter and display the third counter, wherein the third counter is configured to track a number of respective surveillance alerts of the one or more electronic trading systems that have at least one uncommitted configuration override; and in response to receiving a further operator input via the displayed graphical user interface, applying the new value for the first configuration field to an active alert configuration of at least one of the one or more electronic trading systems.

19. A non-transitory computer readable storage medium comprising instructions that, when executed by at least one processor of a computer, causes the computer to perform operations comprising:

storing, in a memory coupled to the at least one processor, a configuration data structure comprising configuration parameters of a plurality of surveillance alerts for one or more electronic trading systems, wherein the configuration parameters for each of the plurality of surveillance alerts comprises a respective set of configuration parameters, and each configuration parameter in each set of configuration parameters comprises one or more configuration fields each comprising a respective initial value;

displaying, on a display device coupled to the at least one processor, a graphical user interface comprising the set of configuration parameters of a selected surveillance alert of the plurality of surveillance alerts, wherein, for each configuration parameter of the set of configuration parameters, the one or more configuration fields are displayed on the graphical user interface;

receiving an operator input via the displayed graphical user interface, the operator input providing a new value for a first configuration field of a first configuration parameter of the selected surveillance alert, wherein the new value is different from the respective initial value of the first configuration field;

in response to receiving the new value for the first configuration field and before the new value for the first configuration field is applied to an active alert configuration of the one or more electronic trading systems:

(a) updating the configuration data structure in the memory to temporarily store the new value as an uncommitted configuration override in association with the first configuration field, wherein the updated configuration data structure associates an initial value and the new value with the first configuration field and directly or indirectly associates the first configuration field with the selected surveillance alert;

(b) adjusting a first counter, wherein the first counter is configured to track a number of uncommitted configuration overrides associated with the selected surveillance alert, wherein the adjusting the first counter includes incrementing the first counter in response to the receiving the new value for the first configuration field;

(c) displaying the adjusted first counter in association with a name of the selected surveillance alert;

(d) adjust a second counter and display a name of at least one of the one or more electronic trading systems in association with the second counter, concurrently with said displaying the adjusted first counter, wherein the second counter is configured to track a total number of uncommitted configuration overrides associated with the one or more electronic trading systems; and (e) adjust a third counter and display the third counter, wherein the third counter is configured to track a number of respective surveillance alerts of the one or more electronic trading systems that have at least one uncommitted configuration overrides; and in response to receiving a further operator input via the displayed graphical user interface, applying the new value for the first configuration field to an active alert configuration of at least one of the one or more electronic trading systems.

* * * * *